United States Patent
Tozawa et al.

(10) Patent No.: US 7,509,305 B2
(45) Date of Patent: Mar. 24, 2009

(54) METHOD FOR DOCUMENT-SEARCHING

(75) Inventors: Akihiko Tozawa, Minato-ku (JP);
Makoto Murata, Tama-ku (JP)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 10/670,068

(22) Filed: Sep. 23, 2003

(65) Prior Publication Data
US 2004/0068494 A1 Apr. 8, 2004

(30) Foreign Application Priority Data
Oct. 2, 2002 (JP) ............................ 2002-290050

(51) Int. Cl.
G06F 7/00 (2006.01)
G06F 17/30 (2006.01)
G06F 17/00 (2006.01)

(52) U.S. Cl. ............................ 707/3; 707/100; 707/102
(58) Field of Classification Search .............. 707/1–300
See application file for complete search history.

(56) References Cited

U.S. PATENT DOCUMENTS

| | | | |
|---|---|---|---|
| 6,052,686 A * | 4/2000 | Fernandez et al. | 707/100 |
| 7,107,282 B1 * | 9/2006 | Yalamanchi | 707/102 |
| 7,127,467 B2 * | 10/2006 | Yalamanchi et al. | 707/102 |
| 7,240,279 B1 * | 7/2007 | Chartier et al. | 715/210 |
| 2004/0034651 A1 * | 2/2004 | Gupta et al. | 707/102 |

OTHER PUBLICATIONS

Mehmet Altinel and Michael J. Franklin, "Efficient Filtering of XML Documents for Selective Dissemination of Information", 2000, Proceedings of the 26th VLDB Coference, Cairo, Egypt.*
Yannis Papakonstantinou and Victor Vianu, "DTD Inference for Views of XML data", 2000, POD 2000, Dallas TX USA.*
W3C, "XML Path Language (XPATH) 2.0", Aug. 16, 2002, W3C. pp. 1-218.*
Kay, Michael, H. "Xpath Expression Syntax". Apr. 13, 1999. http://saxon.sourceforge.net/saxon6.5.3/expressions.html. pp. 1-12.*
D. Olteanu et al., Path: Looking Forward, http://www.cis.uni-muenchen.de/people/Meuss/Pub/XMLDM02.pdf.
OmniMark—building XML Content Engineering Middleware, http://www.tas.co.jp/XML/tools/omni/omnimark.
Stream Index "SIX" Used In XML Stream Processing Toolkit, http://xml.coverpages.org/ni2002-08-26-d.html.

* cited by examiner

*Primary Examiner*—Cam Y Truong
*Assistant Examiner*—Michael Pham
(74) *Attorney, Agent, or Firm*—Shimokaji & Associates, PC

(57) ABSTRACT

Document-searching using a compiling device for generating a two-state input automaton for enabling a state transition by storing an input query expression, performing parsing, and reading at least two states from different types of nodes in an element identifier, and a storage device for storing the two-state input automaton. Also included is an automaton-evaluating device for enabling three state transitions by reading out a two-state input automaton from the storage device and storing the automaton, while reading in a document and identifying the input two states.

4 Claims, 21 Drawing Sheets

```
<html>
  <head><title>Sample</title></head>
  <body>
    <div>
      <p>A sample document</p>
    </div>
    <p>A sample paragraph in div</p>
  </body>
</html>
```

| REACHED STATE | TYPE | CONDITION FOR TRANSITION | STATE OF LEFT NODE | STATE OF LOWER NODE |
|---|---|---|---|---|
| 0 | I, F | ¬p | 0, 1 | 0, 1 |
| 1 | *, I, F | any | 0, 1 | 0, 1 |

QUERY AUTOMATON FOR //p[not(ancestor::div)]

| REACHED STATE | TYPE | CONDITION FOR TRANSITION | STATE OF LEFT NODE | STATE OF LOWER NODE |
|---|---|---|---|---|
| 0 | l, F | ¬p | 0, 1 | 0, 1 |
| 0 | l, F | div | 1 | 2 |
| 1 | *l, F | any | 2 | 0,1 |
| 2 | l | any | 0,1 | 2 |

(a)

QUERY AUTOMATON FOR //*[.//div and.//p]

| REACHED STATE | TYPE | CONDITION FOR TRANSITION | STATE OF LEFT NODE | STATE OF LOWER NODE |
|---|---|---|---|---|
| 0 | F | ¬div | 0, 1 | 2 |
| 0 | F | ¬p | 0, 1 | 3 |
| 1 | *, l, F | any | 0, 1 | 0, 1 |
| 2 | l | ¬div | 2 | 2 |
| 3 | l | ¬p | 3 | 3 |

```
1 proc eval(v)
2   case v
3     u <σ> w </σ> → Ξ := { <q, {x | ∀q', q''. q ∈ δ(σ, q', q'')
4                        ⇒ ∃V. x ∈ V ∧ (<q', V> ∈ eval(u) ∨
<q'', V> ∈ eval(w)) }> | q ∈ Q }
5     s → Ξ := {<q, s> | q ∈ I }
6   esac
7   for <q, x> ∈ Ξ
8     if (q ∈ Θ) Ξ := (Ξ \ {<q, V>}) ∪ {<q, V ∪ {v}>} fi
9   rof
10  return Ξ
11 corp
```

```
<html>
  <head><title>Sample</title></head>
  <body>
    <p>A paragraph</p>
    <div>
        <p>A paragraph in div</p>
    </div>
  </body>
</html>
```

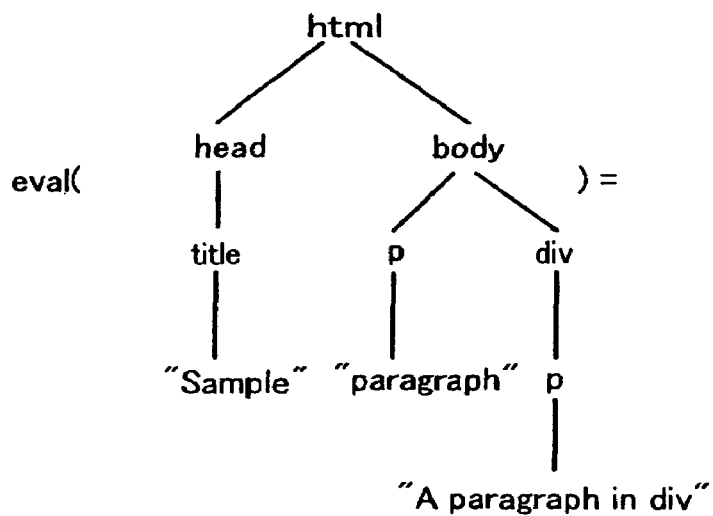
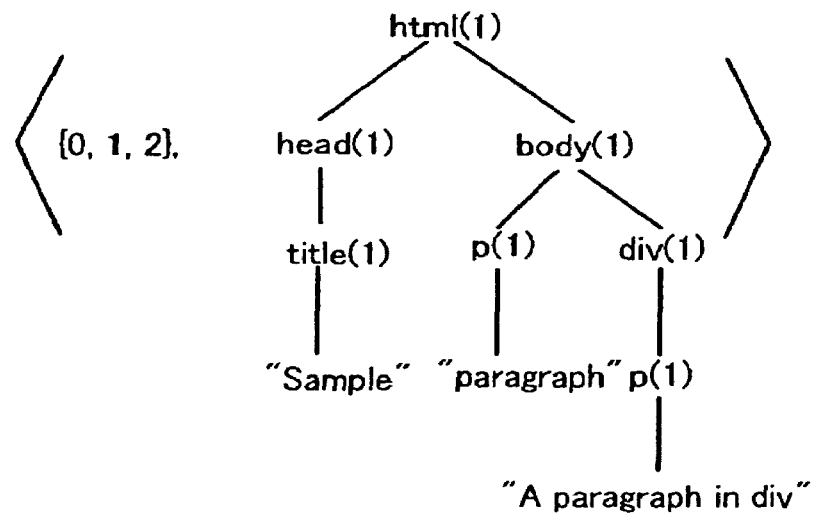
Figure 21

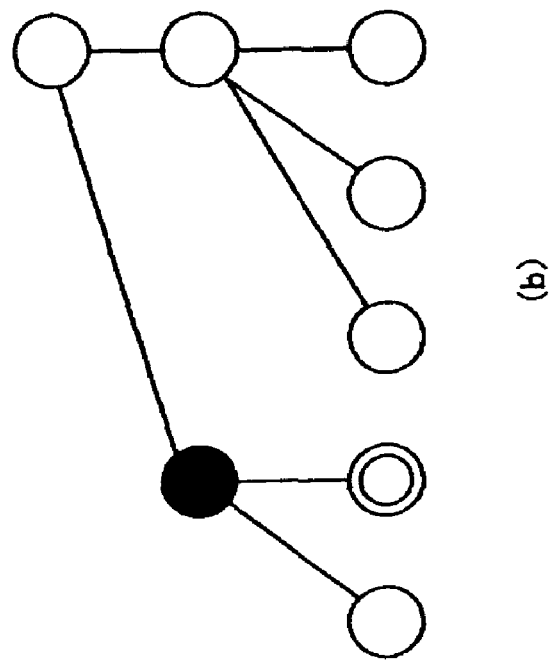
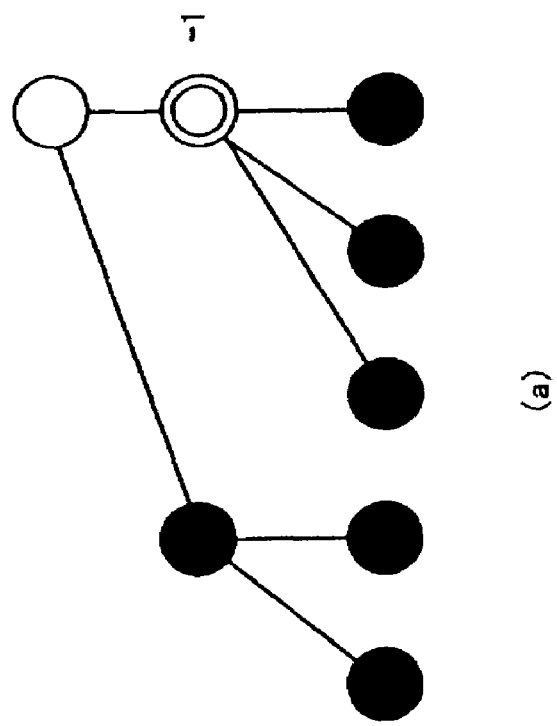
Figure 22

| REACHED STATE | CONDITION FOR TRANSITION | STATE OF LEFT NODE | STATE OF LOWER NODE |
|---|---|---|---|
| ¬a ∧ 1[1;2](¬a∨*) ∧ 2[1;2](¬a∨*) | ¬p | [1;2](¬a∨*) | [1;2](¬a∨*) |
| * ∧ 1[1;2](¬a∨*) ∧ 2[1;2](¬a∨*) | any | [1;2](¬a∨*) | [1;2](¬a∨*) |

Figure 23

| REACHED STATE | CONDITION FOR TRANSITION | STATE OF LEFT NODE | STATE OF LOWER NODE |
|---|---|---|---|
| 0 | ¬p | 0, 1 | 0, 1 |
| 1 | any | 0, 1 | 0, 1 |

Figure 24

| REACHED STATE | TYPE | CONDITION FOR TRANSITION | STATE OF LEFT NODE | STATE OF LOWER NODE |
|---|---|---|---|---|
| 0 | L, F | ¬p | 0, 1 | 0, 1 |
| 1 | *, L, F | any | 0, 1 | 0, 1 |

Figure 25

```
1  proc main(φ)
2    Q := P := {T}, S := Resolved := {}
3    AD := BD := BU := CU := CD := {}
4    AU := {<T, T, T>, <T, T, ε>, <T, ε, T>, <T, ε, ε>}
5    T.succ1 := T.succ2 := T.prec1 := T.prec2 := ε.prec1 := ε.prec2 := {}
6    S-extend(T, {φ})
7    while CD ≠ {} or CU ≠ {}
8      for <q0, q1, q2> ∈ CD
9        CD := CD \ <q0, q1, q2>
10       X1 := S-extend(q1, q0.succ1)
11       X2 := S-extend(q2, q0.succ2)
12       for <_, q1', q2'> ∈ {q0} × X1 × X2 \ AD \ BD
13         if ¬∃ φ. -1φ ∈ (q1'.term \ q1.term) ∧ ¬∃ φ. -2φ ∈ (q2'.term \ q2.term)
14           then AD := AD ∪ {<q0, q1', q2'>}
15           else BD := BD ∪ {<q0, q1', q2'>}, CU := CU ∪ {<q0, q1', q2'>}
16         fi
17         CU := CU ∪ {q0} × (q1'.sub \ Resolved) ×(q2'.sub \ Resolved)
18            ∪ {q0} × {q1'} ×(q2'.sub \ Resolved) ∪ {q0} × (q1'.sub \ Resolved) × {q2'}
19       rof
20     rof
21     for <q0, q1, q2> ∈ CU
22       CU := CU \ <q0, q1, q2>
23       X := P-extend(q0, q1.prec1 ∪ q2.prec2)
24       for <q0', _, _> ∈ X × {q1} × {q2} \ AU \ BU
25         if ¬∃ φ. 1φ or 2φ ∈ (q0'.term \ q0.term)
26           then AU := AU ∪ <q0', q1, q2>
27           else BU := BU ∪ <q0', q1, q2>, CD := CD ∪ <q0', q1, q2>
28         fi
29         CD := CD ∪ (q0'.sub \ Resolved) × {q1} × {q2}
30       rof
31     rof
32   elihw
33   δ := {}
33   for <q0, q1, q2> ∈ AD ∪ AU
34     R0 := {q | q.base = q0 ∧ q ∈ Resolved ∩ S}
35     R1 := {q | q.base = q1 ∧ q ∈ Resolved ∩ P}
36     R2 := {q | q.base = q2 ∧ q ∈ Resolved ∩ P}
37     D := ({q0} ∪ R0) × ({q1} ∪ R1) × ({q2} ∪ R2)
38     for <q0', q1', q2'> ∈ D
39       δ := δ ∪ {(σ1∧...∧σn, q1', q2')→q0'} (σ1, ..., σn ∈ q0'.term)
40     rof
41   rof
42   F := {q | ∃ Φ. Φ ⊆ q.term ∧ Φ ∈ expand(φ)}
43   return <Q, F, δ>
44 corp
```

Figure 27

```
1  proc expand(Φ)
2    Ψ := ∅
3    for φ ∈ Φ
4      Φ := Φ \ {φ}
5      case φ
6        σ → Ψ := Ψ ∪ {σ}
7        ψ ∧ ψ' → Φ := Φ ∪ {ψ, ψ'}
8        ψ ∨ ψ' → return expand(Φ ∪ Ψ ∪ {ψ}) ∪ expand(Φ ∪ Ψ ∪ {ψ'})
9        [m]ψ → Φ := Φ ∪ {ψ} ∪ {b[m]ψ | b ⊆ m}
10       ⟨m⟩ψ → return expand(Φ ∪ Ψ ∪ {ψ}) ∪ U_{b ⊆ m} expand(Φ ∪ Ψ ∪ {b⟨m⟩ψ, (b)})
11       otherwise Ψ := Ψ ∪ {φ}
12     esac
13   fi
14  rof
15  return {Ψ}
16 corp
```

Figure 28

```
1  proc d-extend(q, Φ)
2    if q = ε return {ε}
3    X := {}
4    Ξ := expand(Φ)
5    if ∃ Ψ ∈ Ξ. Ψ ⊆ q.term then Ξ := {{}} fi
6    for Ψ ∈ Ξ
7      if ( q ∈ S ∧ d = S) ∨ ( q ∈ P ∧ d = P)
8        then q' := ⟨q.term ∪ Ψ , q.base⟩
9        else q' := ⟨q.term ∪ Ψ, q⟩
10     fi
11     X := X ∪ {q'}
12     if ¬(q' ∈ Q) then
13       Q := Q ∪ {q'}
14       q'.succ1 := {ψ | 1 ψ ∈ q'.term \ q'.base.term }
15       q'.succ2 := {ψ | 2 ψ ∈ q'.term \ q'.base.term }
16       q'.prec1 := {ψ | -1 ψ ∈ q'.term \ q'.base.term}
17       q'.prec2 := {ψ | -2 ψ ∈ q'.term \ q'.base.term}
18       if d = S then
19         S := S ∪ {q'}
20         if q'.succ1 = q'.succ2 = {} then Resolved := Resolved ∪ {q'}
21         else
22           q'.succ1 := q'.succ1 ∪ q'.base.succ1
23           q'.succ2 := q'.succ2 ∪ q'.base.succ2
24           CD := CD ∪ {⟨q', q1, q2⟩ | ⟨q'.base, q1, q2⟩ ∈ AU ∪ BU, q1, q2 ∈ Q}
25         fi
26       else
27         P := P ∪ {q'}
28         if q'.prec1 = q'.prec2 = {} then Resolved := Resolved ∪ {q'}
29         else
30           q'.prec1 := q'.prec1 ∪ q'.base.prec1
31           q'.prec2 := q'.prec2 ∪ q'.base.prec2
32           CU := CU ∪ {⟨q0, q', q''⟩ | ⟨q0, q'.base, q''.base⟩
                          ∈ AD ∪ BD, q0 ∈ Q, q'' ∈ P \ Resolved}
33                     ∪ {⟨q0, q'', q'⟩ | ⟨q0, q''.base, q'.base⟩
                          ∈ AD ∪ BD, q0 ∈ Q, q'' ∈ P \ Resolved}
34                     ∪ {⟨q0, q', q2⟩ | ⟨q0, q'.base, q2⟩ ∈ AD ∪ BD, q0, q2 ∈ Q}
35                     ∪ {⟨q0, q1, q'⟩ | ⟨q0, q1, q'.base⟩ ∈ AD ∪ BD, q0, q1 ∈ Q}
36         fi
37       fi
38     fi
39   rof
40   return X
41 corp
```

Figure 29

METHOD FOR DOCUMENT-SEARCHING

This application claims the benefit of the filing date of Japanese Patent Application JP2002-290050, filed 2 Oct. 2002.

FIELD OF THE INVENTION

The present invention generally relates to document-searching and more specifically to a system and a method for searching a document for performing a search on a stream basis by using a query automaton for an element (node) of a document that is specified by an expression to be searched for, a program for causing a computer to perform the document-searching method, and a computer-readable storage medium storing the program for causing a computer to perform the document-searching method. The present invention further relates to a compiling device and a compiling method for generating a query automaton in the above-mentioned document-searching system, a program for causing a computer to perform the compiling method, and a computer-readable storage medium storing the program. The present invention also relates to a query automaton evaluator used in the above-mentioned document-searching.

BACKGROUND

A document processed in a computer and the like is known to be in a form of text, HTML (Hypertext Markup Language), SGML (Standard Generalized Markup Language), or XML (Extensible Markup Language), which draws attention as a next generation HTML. Among these forms of document, HTML, SGML, XML enable a document to include a hierarchical structure using element identifiers "<" and "/>" to be referenced as tags, so that a document can contain more pieces of information than a text form does. Therefore, these forms have been widely used in a computer. As a method for effectively searching a document that contains the hierarchical structure, there has been generally known a method for searching with a query expression for a document or node, which contains a corresponding element to the query expression. As a query expression, an XPath expression to search an XML document is particularly known.

An XPath expression is configured by including a character string consisting of an element and a string of conditions for an attribute (exactly it is a location step) separated by slash "/". For example, /html/body/p is an XPath expression consisting of three conditions of "html", "body", and "p". In this case, each of "html", "body", and "p" is a condition for a name of the element (tag name). When the XPath expression /html/body/p is evaluated against a certain HTML document, an element "p" which exists immediately under an element "body" which exists immediately under an element "html" is searched for. In general, a tree includes a plurality of such elements "p". Usually, an XPath expression searches a set of nodes in an XML document.

In an XPath expression, an axis may be specified in addition to a condition for a tag name. If no axis such as /html is specified, for example, an element "child" existing immediately under a node (a child of the node) of a tree structure of a node will be designated as an axis. In specifying an axis in an XPath expression, an axis can be specified by syntax such as /decendant::p. "decendant" indicates a descendant element. When an axis is defined as /descendant::p, all descendant "p's" within the tree structure can be searched instead of an element existing immediately below. The axis "descendant" can be abbreviated as "//p" or the like for simplicity.

In an XPath expression, a predicate can also be specified in addition to a condition for a tag name and an axis. A predicate describes a condition that should be satisfied in a node of XML tree during a search of the node. Predicates can be logically connected with "and", "or", or "not".

For a specification of the above-mentioned XPath, W3C specification has been proposed. As an XPath evaluating system, which complies with XPath in W3C specification, Xalan and the like has been known. In the evaluating system, all of an axis and a predicate of XPath can be evaluated. The XPath evaluating system is implemented in a computer and the like by deploying all XML documents on memory by using DOM or other similar data structures. DOM is known as an XML operating interface for deploying all tree structures of an XML document on memory. A system and a method referred to as SAX are also known. SAX is an interface (API) for reading out an XML document sequentially from the top of the document in a form of event. In the present invention, an application interface (API) for reading out an XML document sequentially from the top of the document such as SAX will be collectively called a stream-based API for reference.

With regard to a document-searching system for causing a document to be read out sequentially from the top of it by using the above-mentioned stream-based API, for most cases, a document is read out from left to right for (1) priority in depth and (2) arrangement of nodes in a tree structure expression of an XML document. As a SAX-based-XPath evaluating system, XMLTK, which is disclosed in http://XML.coverpages.org/ni2002-08-26-d.html, and the like have been proposed. The conventional stream-based evaluating systems are inconvenient in that they cannot process the region that fully meets a logical specification accepted in XPath. Much effort has been put to reduce the above-mentioned inconvenience. For example, D. Olteanu et al. try to remove an axis in the opposite direction from XPath in XPath: Looking Forward, http://www.cis.uni-muenchen.de/people/Meuss/Pub/XMLDM02.pdf, which is inadequate in processing a logic in a region that fully meets XPath specification.

Another technical concept of "automaton" consisting of a storage means for holding a symbol, a device for reading out a symbol written in the storage means, and a state-controller is known. An automaton is assumed to read into a symbol written in a storage means, to transit an inner state by using a previous state of a state-controller and a symbol read in, and to finish the process when the latest state held in the state-controller and a transition state match. As being implemented in a computer, an automaton includes a table structure consisting of a plurality of state transitions. The basics of the above-mentioned automaton are described in detail in an exemplary document "Introduction to Automata Theory, Languages, and Computation I, II" by John E. Hopcroft, Jeffrey D. Ullman (translated by Nozaki, Takahashi, Machida, and Yamazaki), published by SAIENSU-SHA, 1986.

In the present invention, a term "a query automaton" refers to an automaton for causing a certain state of an automaton to be distinguished from other states as a search state and for causing a state-control different from that for other states to be performed. Such search automata have been proposed by Neven (F. Neven, Design and Analysis of Query Languages for Structured Documents, PhD Thesis, Limburgs Universitair Centrum, 1999) and the like. Neven's method studies characteristics of search automata and the like with no suggestion made for query automaton's applicability to a stream-based document-searching system and its specific configuration.

Among the above-mentioned conventional evaluating device, an evaluating device such as Xalan complying with W3C specification is configured mainly using DOM. The reasons for this is as follows:

1. XPath expression //a/ancestor::b is an XPath expression pointing to an element "b" that is an ancestor of an element "a" that exists somewhere in a document stored (In the above expression, "//a" is an abbreviation for "/descendant::a"). This type of XPath expression is generally evaluated with an action of descending and then ascending the tree structure. Thus, this type of XPath expression cannot be evaluated by a method for sequentially reading out an XML document from the top.

2. XPath expression //a/preceding-sibling::b is an XPath expression pointing to a following element "b" of an element "a" that exists somewhere in an XML document stored. In the XPath expression, an evaluation is performed with an action of moving rightward and then returning leftward in a tree structure. Thus, this type of XPath expression cannot be evaluated by a method for sequentially reading out an XML document from the top of a document.

3. XPath expression //a[.//b] selects all XML documents that include an element "a" having an element "b" as its descendant. This XPath expression is evaluated in the order of: (i) searching an element "a"; and then (ii) checking if an element "b" is in the descendants. This evaluation can be performed by sequentially checking a document from the top. As an element "a" is selected as a result, information on where an element "a" exists should be stored.

4. XPath expression //a[.//b and.//c] selects an XML document that includes an element "a" having elements "b" and "a" as its descendants. This XPath expression is evaluated in the order of: (i) searching an element "a"; then (ii) checking if an element "b" is in the descendants; and finally (iii) checking if an element "c" exits or not. This evaluation cannot be performed by sequentially checking an XML document from the top, either.

The above reason 4 is referred to as a conjunctive condition. An XPath expression //a[.//b or.//c] selects an XML document that includes an element "a" having an element "b" or "c" as its descendant. This XPath expression is referred to as a disjunctive condition. An XPath expression that only includes a disjunction can be immediately rewritten into, for example, .//a[.//*[name( )="b" or name( )="c"]]. Therefore, an evaluation can be performed in a manner of: (i) searching an element "a"; and then (ii) continuing the search until a node whose name is "b" or "c" is encountered in descendants.

Therefore, in conventional stream-based document searches, an XPath expression can be easily sequentially evaluated from the top of the document if neither a special axis (referred to in reasons 1 and 2) nor a special predicate (associated with reasons 3 and 4) is included.

Although a document evaluating system using a conventional DOM has been known as mentioned above, DOM is inconvenient in that it has lower memory efficiency and poorer performance than a stream-based SAX, because DOM needs all provided XML documents to be deployed on memory. Another evaluating system can be assumed as an evaluating system using DOM. The system never causes a necessary part of a document to be read in until the node is about to be looked at. DOM never discards a tree structure of an XML document, which has been read in and constructed, even in such an evaluating device. Some XML documents are too big to be stored in a memory of several gigabytes. It is impractical to create and store a DOM tree for such a big XML document on memory in terms of hardware resources. This has been a constraint on applicability of a document-searching system.

With a naive algorithm using a DOM tree, the same part of a document is repeatedly checked over and over as mentioned above. This provides rather poor efficiency as an evaluation algorithm for an XPath. If, for example, descendant nodes of an element "a" can be checked for "b" in evaluation of //a[.//b], while checking whether the node is another element "a" to be searched, document-searching can be more efficient.

When an XPath expression does not have any special axis or predicate, the XPath expression can be easily evaluated by an event-driven processing system such as SAX as mentioned above. However, from the above reasons 1 to 4, as a manner with a technique of a conventional stream search, all representation such as an axis or predicate cannot be interpreted. This results in problems including: "A" only a condition for a child can be written in a predicate (e.g., an XPath expression //a[.//b] cannot be written), "I" an evaluation of a predicate is currently avoided in XMLTK, and "HA" although omnimark, which is disclosed in http://www.tas.co.jp/XML/tools/omni/omnimark as a famous document conversion device for SGML, has been known, a path evaluation cannot be performed by describing "and" between two conditions (e.g., //a[.//b and .//c] cannot be described), and so on.

It is also possible to obtain //b//a as an equivalent XPath expression by removing an "ancestor" axis from an XPath expression of //a[ancestor::b], for example, by means of a technique for removing an axis in the opposite direction from an XPath expression as shown in Olteanu et al. to solve the above-mentioned problems. However, the above-mentioned method is not a general method and provides a completely different result if, for example, an "ancestor" axis, which is an axis in the opposite direction, is removed from an XPath expression //a[not(ancestor::b)]. Neither document-searching system nor document-searching method for evaluating an evaluating device complying with W3C specification supporting all the above-mentioned problems by using a stream-based API has been known.

Moreover, both a searching system using DOM and a searching system using SAX have a problem that they cannot perform a path evaluation by connecting two conditions with "and". Conventional searching systems also have a problem that they cannot perform a path evaluation including an axis for a following element (following-sibling, preceding-sibling, etc.). In addition, conventional searching systems have a problem that they cannot process a negative expression of "not", which indicates that there is no node to meet a predicate.

[Problems to be Solved by the Invention]

The present invention is adapted in view of the above-mentioned problems of prior art. The present invention intends to enable document-searching on the basis of a stream-based API that can interpret all the above-mentioned representation of an axis and predicate, has high versatility against an input query expression, enables an evaluation to be performed with high efficiency, and also enables a hardware resource to be saved. Hereinafter, a stream-based search will be referred to simply as a stream search.

SUMMARY OF THE INVENTION

The present invention is adapted under a new idea that problems of conventional document-searching systems can be solved by adapting a document-searching system with an automaton, and by configuring a query automaton, which enables a state transition among three states of an initial state, a final state, and search state by identifying a plurality of different tree structures through determination of a type of element identifier and by making a plurality of results from the plurality of different tree structures as inputs, among state transitions of a document-searching system. The document-searching system according to the present invention identifies a search state and causes a process different from one for either an initial state or a final state to be performed in a search state. A query automaton is expressed in a table structure configured by compiling an input query expression and including a set of states including an initial state, a final state, and a search state. In the present invention, a forward node and a backward node are defined by determining a type of element identifier. In the present invention, a state transition is generated by identifying backward nodes as a plurality of tree structures and by inputting states of the plurality of backward nodes in the tree structure.

In the present invention, a query automaton interprets an input stream, performs an automaton by interpreting a node against each node, and stores an inner state of an automaton when the node is interpreted. In the present invention, this storage is referred to as state assignment for a node. According to the above-mentioned description, it is assumed that a node is searched when a state assignment for a predetermined node is in a search state. A query automaton used in the present invention can determine a query expression with a special axis or predicate to perform a process.

The query automaton evaluator included in the document-searching system according to the present invention performs an action of calculating a state after a transition for a tuple of states obtained from backward nodes in a tree. The query automaton evaluator makes a node that may be searched to be held on memory, while transiting. When a given node is decided to be in a search state, a query automaton can output the node from memory as search output and delete the output node.

On the other hand, a query automaton evaluator has no problem in document-searching, for the device stores a node, which has already transited into a search state, even after information on the node being deleted from memory when it is determined that the node is not going to be searched. This is because the present invention provides functionality for allowing a search result to be given by configuring a query automaton including a search state, rather than by outputting the search result as a final state. By using a document-searching system according to the present invention, memory efficiency is improved, and any number of logically combined query expressions can be evaluated at a time, for the same part of a tree needs to be followed only once.

The above-mentioned functionality according to the present invention is provided by a compiling device, which generates a query automaton for a computer. A compiling device for a query automaton according to the present invention generates a query automaton by identifying a special axis and replacing a read predicate with each state transition of a query automaton.

The present invention provides a document-searching system for searching a document having a hierarchical structure with elements separated by element identifiers, including:

a compiling device for generating a query automaton by storing an input query expression, performing parsing, identifying different types of nodes in the element identifiers;

a storage device for storing the query automaton generated by the compiling device; and a query automaton evaluator for reading out the query automaton from the storage device and storing the automaton, while reading in the document and performing a stream search by using states of a plurality of different types of nodes in the element identifiers included in the document and the query automaton and outputting the searched node.

In the present invention, the query automaton evaluator preferably determines a state transition of a node under determination at the moment by storing a left node and a lower node in correspondence with an identified element identifier, evaluating the query automaton with a search result of the left node and the lower node.

The compiling device according to the present invention generates a query automaton with a state transition corresponding to an initial state, a final state, and a search state registered thereon.

The present invention further provides a document-searching method for searching a document having a hierarchical structure with elements separated by element identifiers, including the steps of:

generating a query automaton by storing a query expression input by a compiling device, performing parsing, identifying different types of nodes in the element identifiers;

storing the query automaton generated by the compiling device in a storage device;

reading out the query automaton from the storage device and storing the query automaton, while reading in the document and performing a stream search with a query automaton evaluator by using states of a plurality of different types of nodes in the element identifiers included in the document and the query automaton.

The present invention further provides a computer-executable program for performing a document-searching method for searching a document having a hierarchical structure with elements separated by element identifiers, wherein the program causes a computer to perform the steps of:

functioning as a compiling device for generating a query automaton by storing an input query expression, performing parsing, identifying different types of nodes in the element identifiers;

storing the query automaton generated by the compiling device in a storage device; and functioning as a query automaton evaluator for reading out the query automaton from the storage device and storing the query automaton, while reading in the document and performing a stream search by using states of a plurality of different types of nodes in the element identifiers included in the document and the query automaton.

The present invention further provides a computer-readable storage medium storing a computer-executable program for performing a document-searching method for searching a document having a hierarchical structure with elements separated by element identifiers, wherein the program causes a computer to perform the steps of:

functioning as a compiling device for generating a query automaton by storing an input query expression, performing parsing, identifying different types of nodes in the element identifiers;

storing the query automaton generated by the compiling device in a storage device;

functioning as a query automaton evaluator for reading out the query automaton from the storage device and storing the query automaton, while reading in the document and performing a stream search by using states of a plurality of different types of nodes in the element identifiers included in the document and the query automaton.

The present invention further provides a compiling device for generating a query automaton for performing a document search, wherein the compiling device generates and registers a state transition by replacing an axis including an axis in the opposite direction and a logical expression including a conjunction or a negative expression while keeping an input query expression equal in terms of search, wherein the compiling device generates a query automaton including a plurality of states of the backward nodes, a condition for transition, and at least a search state.

The compiling device according to the present invention identifies the backward node as a left node and a lower node according to a type of element identifier mentioned above, wherein the plurality of states are preferably states of the left node and the lower node.

The present invention further provides a compiling method for generating a query automaton for performing a document search, including the steps of:

generating and registering a state transition by replacing an axis including an axis in the opposite direction and a logical expression including a conjunction or a negative expression while keeping an input query expression equal in terms of search, and storing a plurality of states of the backward nodes in correspondence with the backward nodes into a storage device;

generating a query automaton by registering a plurality of states of the backward nodes, a condition for transition, at least a search state, and a reached state in correspondence with each other in the storage device.

The present invention further provides a program for causing a computer to perform a compiling method for generating a query automaton for performing a document search, wherein the program causes a computer to perform the steps of:

generating and registering a state transition by replacing an axis including an axis in the opposite direction and a logical expression including a conjunction or a negative expression while keeping an input query expression equal in terms of search, and storing the plurality of states of the backward nodes in correspondence with the backward nodes into a storage device; and generating a query automaton by registering a plurality of states of the backward nodes, a condition for transition, at least a search state, and a reached state in correspondence with each other in the storage device.

The present invention further provides a computer-readable storage medium storing a program for causing a computer to perform a compiling method for generating a query automaton for performing a document search, wherein the program causes a computer to perform the steps of:

generating and registering a state transition by replacing an axis including an axis in the opposite direction and a logical expression including a conjunction or a negative expression while keeping an input query expression equal in term of search, and storing the plurality of states of the backward nodes in correspondence with the backward nodes into a storage device;

generating a query automaton by registering a plurality of states of the backward nodes, a condition for transition, at least a search state, and a reached state in correspondence with each other in the storage medium.

The present invention further provides a document-searching system for searching a document having a hierarchical structure with elements separated by element identifiers, including:

a compiling device for generating a two-state input automaton for enabling a state transition by storing an input query expression, performing parsing, reading at least two states assigned to different types of nodes in the element identifiers;

a storage device for storing the two-state input automaton; and an automaton-evaluating device for enabling a state transition by reading out two-state input automaton from the storage device and storing the automaton, while reading in the document and identifying the two states.

The two states according to the present invention are states of a left node and a lower node in a tree structure generated in correspondence with an identified element identifier. The two-state input automaton uses three state transitions of the automaton-evaluating device.

The present invention further provides a query automaton evaluator for evaluating a query automaton for searching a document having a hierarchical structure with elements separated by element identifiers, including:

means for reading out a query automaton from a storage device which enables a plurality of inputs generated by a compiling device to be determined at a time and storing the query automaton;

means for identifying a plurality of different types of inputs of the element identifiers included in the document; and means for assigning a state transition among three states including a search state by using the identified input and a plurality of inputs registered in the query automaton.

DESCRIPTION OF THE DRAWINGS

The present invention is now described in conjunction with specific embodiments illustrated in the drawings, though the present invention is not limited to the above-mentioned particular embodiments; various modifications and other embodiments and known components can be used within the scope where the present invention takes effect.

FIG. 6 is a table showing another embodiment of a query automaton according to the present invention;

FIG. 21 is a diagram showing an embodiment of a returned value generated by the above-mentioned functionality of a function "eval";

FIG. 22 is a diagram showing an XML tree treated as a binary tree on treating a basic mode b(=1, 2, −1, −2);

FIG. 23 is a table showing an automaton generated by a compiling method according to the present invention;

FIG. 24 is a table showing an automaton with an advanced step of process generated by a compiling method according to the present invention;

FIG. 25 is a table showing a query automaton finally generated by a compiling method according to the present invention;

FIG. 27 is a diagram showing a pseudo-code of a function "main" in the present invention;

FIG. 28 is a diagram showing a pseudo-code of a function "expand" for performing a process of rewriting an expression; and FIG. 29 is a diagram showing a pseudo-code of functions S-extend and P-extend (collectively referred to as "d-extend").

DETAILED DESCRIPTION

Figure 1:
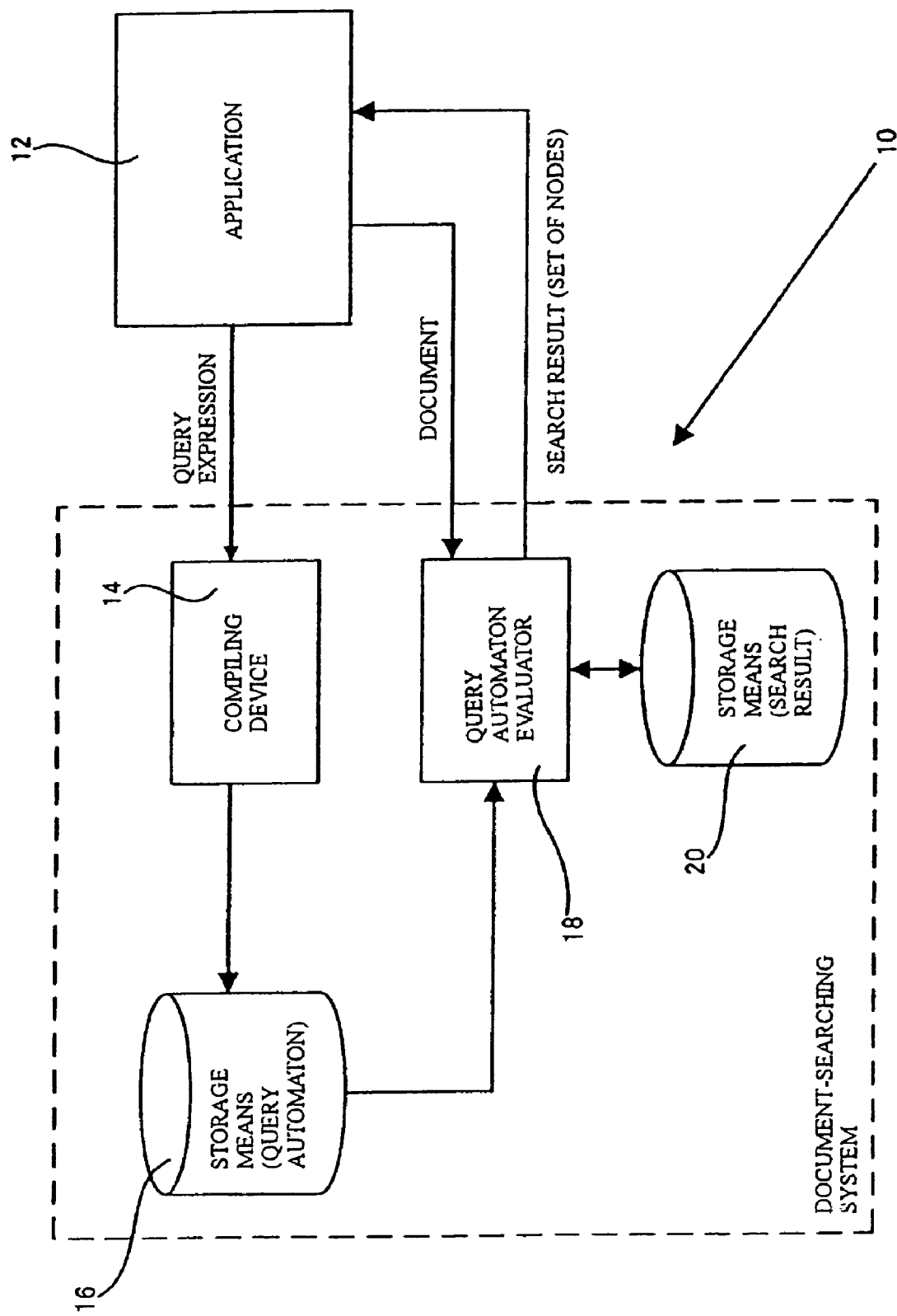
FIG. 1 is a diagram showing a brief configuration of a document-searching system according to the present invention.

The present invention will be described in conjunction with the embodiments illustrated in the attached drawings, though the present invention is not limited to the embodiments shown in the drawings. For clear understanding of the present invention, an XML document will be described in the following embodiments by using an XML document-searching system that performs a search with an XPath expression. The present invention can be applied to any hierarchical document including an element identifier.

A: Outline of a Document-searching System

FIG. 1 shows a schematic view of a configuration of a document-searching system according to the present invention. A document-searching system 10 according to the present invention is configured by including a compiling device 14, which functions as an API used by an application 12 for reading out a query expression written in an XPath expression and the like from application 12 and compiling the query expression into a query automaton, and a storage device 16 for storing the compiled and generated query automaton. A Document-searching system 10 according to the present invention is implemented by including a query automaton evaluator 18, which generates a search result by reading out a document under control of application 12 and a query automaton stored in storage device 16 and performing a document search, and stores the generated search result into a storage device 20. The stored search result can be used by application 12 by itself reading out the stored search result or by query automaton evaluator 18 outputting the result into application 12.

Each device means used in a document-searching system according to the present invention will be specifically described with a case that searches an XML document. Compiling device 14 reads in an XPath expression specified by application 12, performs parsing of the input XPath expression with a parser, which is not shown, for example, and converts an axis and a predicate included in the XPath expression and a logical product, a logical add and a logical NOT of each predicate into a state transition to be registered as an automaton. The query automaton is configured as a table consisting of a state of each node converted, a condition for transition, a type of transition, and a reached state. A generated query automaton is stored in storage device 16 such as a hard disk.

Storage device 16 is configured by including a hard disk and a programmable storage medium such as a flash memory, and stores a generated query automaton. A query automaton stored in storage device 16 is passed onto a query automaton evaluator, which can search a document. The query automaton evaluator will be described below.

Query automaton evaluator 18 according to the present invention functions as a state machine; it reads in a query automaton and an XML document for performing a search, performs parsing, and performs evaluation of an XML document. Query automaton evaluator 18 searches an XML document by using a query automaton held in storage device 16, stores a node of the searched XML document into storage device 20, and passes it onto application 12. Query automaton evaluator 18 transits to a search state when a node specified by an XPath expression is searched in an XML document specified by an XPath expression. A node under evaluation at the moment of transition is recorded in storage device 20 and held there until it is output.

Figures 2, 3:
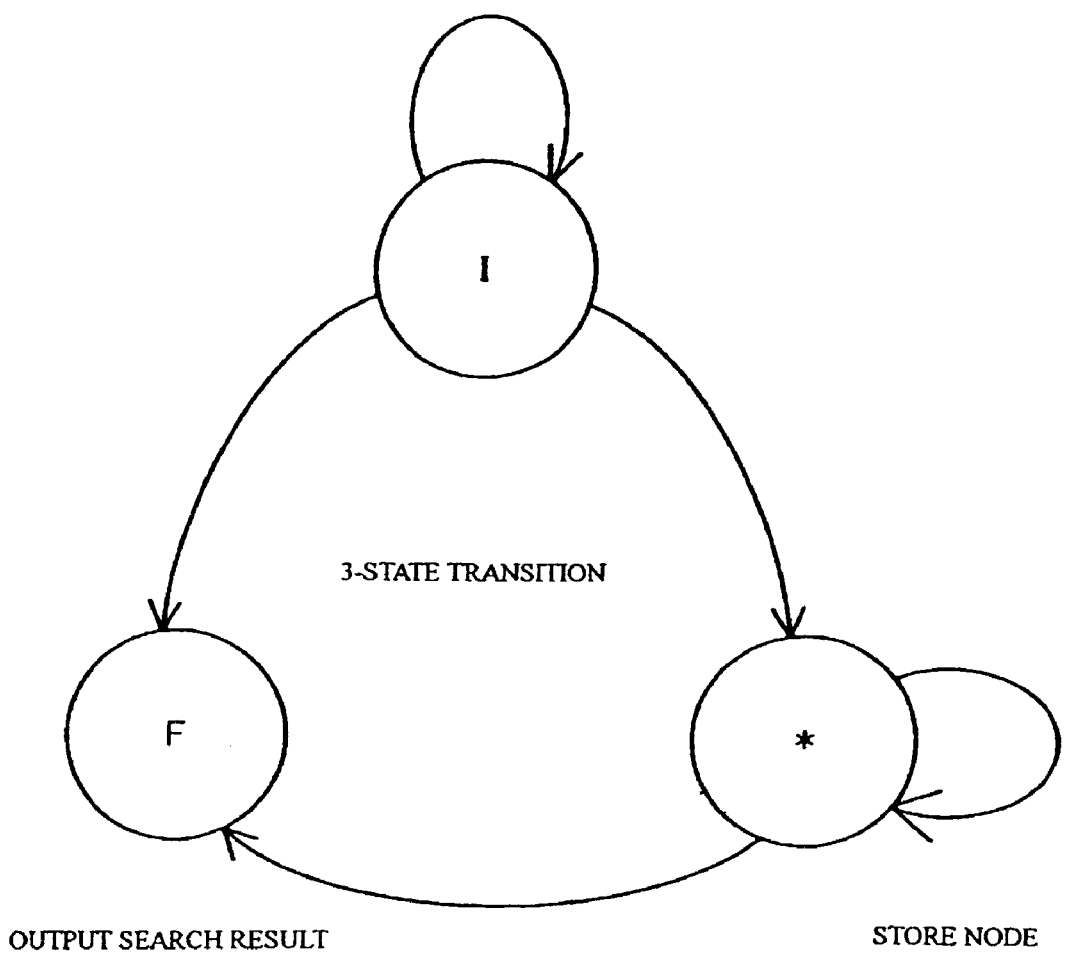
FIG. 2 is a diagram illustrating a state transition in a document-searching system according to the present invention.
FIG. 3 is a diagram showing a specific embodiment of an XML document that can be used in the present invention.

FIG. 2 is a diagram illustrating a state transition in a document-searching system according to the present invention. Processes performed by a document-searching system in a search state and in a final state are also illustrated in the figure. As it is shown in the figure, a document-searching system according to the present invention performs a state transition among three states of initial state I, final state F, and search state "*". When an XPath expression is input and a search starts, the state changes by transiting from initial state I to final state F or search state "*". In search state "*", a node that caused a transition into search state F is stored in storage means. In a particular embodiment according to the present invention, every node detected until the state is transited to final state * is stored in storage means. In final state F, a node stored and searched is passed onto an application and an output process is performed in response to a search request of an application.

B: Device and Software Means for Configuring a Document-searching System

Each component device illustrated in FIG. 1 configuring a document-searching system according to the present invention will be described in detail.

1. Query Automaton

In the present invention, a query automaton is configured as a table structure that contains a state of each node, a condition for transition, a type of transition, and a reached state by compiling an XPath expression input from an application. The query automaton consists of a collection of entries expressing a state transition (hereinafter called "a state transition"). A state transition expresses a transition from a tuple of states about a backward node to a state about a forward node. Usually, terms "parent", "child" and the like are used to express a hierarchical structure for a node in a tree structure such as an XML document. As a tree structure is considered as a stream (a sequence of nodes) in the present invention, it is described with the idea of "forward" and "backward". In the present invention, a backward node means a node that is closed with a closing tag when it is seen from the top of the XML document, and every prior node is defined as a "forward node".

FIG. 3 shows a specific embodiment of an XML document that can be used in the present invention. As it is shown in the figure, a typical XML document consists of an opening tag and a closing tag. In the present invention, an opening tag means a tag indicated with "<html>", and a closing tag specifically means a tag such as "</html>". An opening tag and a closing tag can be considered to form a tree structure with a content between the tags being a child.

Figures 4, 5:
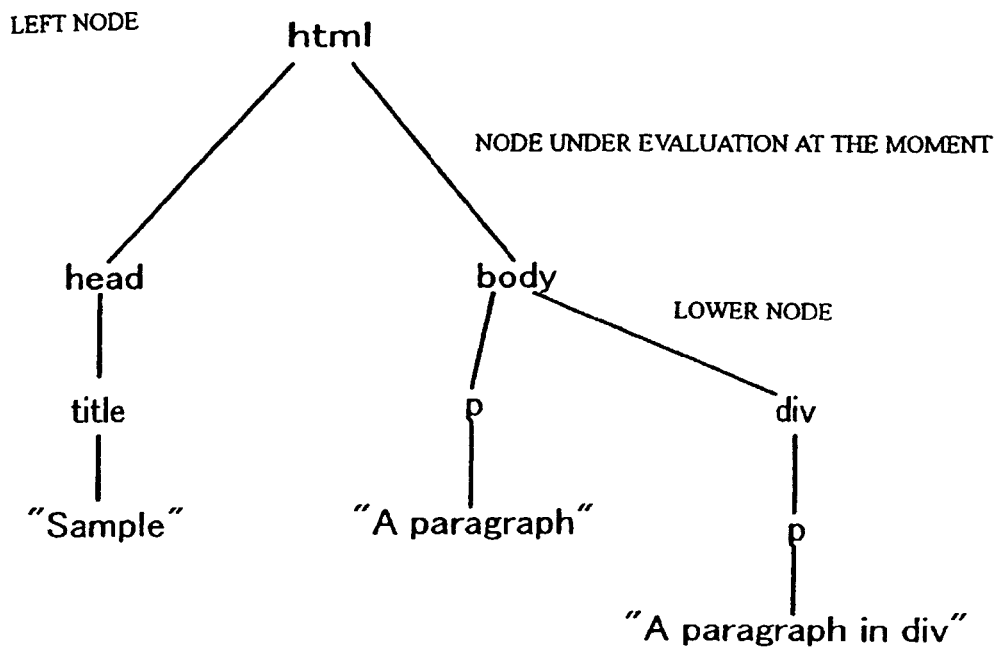
FIG. 4 shows a tree structure of the XML document shown in FIG. 3.
FIG. 5 is a table showing an embodiment of a query automaton consisting of a collection of state transitions from a left node and a lower node generated by the present invention to a node currently under determination as an embodiment of the present invention.

In the present invention, when a "body" tag shown in FIG. 3 is closed, "title" node, "head" node, "div" node, and two "p" nodes are all defined as backward nodes of the "body" node. FIG. 4 shows a tree structure of the XML document shown in FIG. 3.

According to a definition of the present invention, in FIG. 4, backward nodes of "body" node will be (1) "head" node, which is a sibling of "body" node, and any backward nodes thereof, (2) "div" and "p" under "body" node and any backward nodes thereof (not shown). "div" node is defined as a backward node of "p" node. According to a definition of the present invention, backward nodes nearest to "body" node are a "head" node and a second "p" node. In the present invention, these nodes are referred to as a left node and a lower node of "body" node, respectively.

FIG. 5 shows an embodiment of a query automaton consisting of a collection of state transitions from a left node and a lower node generated by the present invention to a node currently under determination, as an embodiment of the present invention. A query automaton shown in FIG. 5 only indicates a query automaton generated by a compiling device for an XPath expression given by "//p". The inventors consider any query automaton that can be generated by a compiling method described below will be within the scope of the present invention. As it is shown in FIG. 5, in a query automaton generated by the present invention, a reached state, a type of transition, a condition for transition, and a state of a left node and a lower node mentioned above are registered in pairs. An XPath expression given by ".//p" refers to an instruction to "search every "p" node which is present somewhere." A query automaton shown in FIG. 5 is configured to assign state 0, which is not a search state, to a node where no "p" is established, i.e., a node whose tag name is other than "p". In a query automaton illustrated in FIG. 4 and described below, 0 or 1 with I indicates an initial state, 0 or 1 with F indicates a final state, and "*" indicates a search state.

In a query automaton generated in the present invention shown in FIG. 5, one state transition is generated in correspondence with an upper line. This transition is indicated as a reached state where a state of a left node and a state of a lower node are given as an input. A state transition of a query automaton generated by the present invention will be explained with reference to FIG. 5. In the upper line of the table shown in FIG. 5, states 0, 1 are specified as states of a left node and a lower node. This means when a left node may take a state of 0 or 1 and a lower node may take a state of 0 or 1, a reached state to a node under evaluation at the moment may be 0. Øp is an operator to cause a state transition when a state of a left node, a lower node or a node under determination at the moment is other than "p". In other words, in the case of a state transition specified in the upper line shown in FIG. 5, a state transition occurs when neither a left node nor a lower node is "p". It also means that a query automaton shown in FIG. 5 causes a state transition of a node under determination at the moment by using states of a left node and a lower node.

A state transition specified in the lower line in a query automaton shown in FIG. 5 can take a state where a left node and a lower node are "p" or otherwise. A condition for transition "any" is an operator indicating that a transition is caused for any name of node. Therefore, a state such as search state "*", initial state I, or final state F is generated depending on whether a state of lower node or a state of a left node includes "p" or not, and whether a node under evaluation at the moment is "p" or not.

FIG. 6 is a table showing another embodiment of a query automaton according to the present invention. An embodiment of a query automaton shown in FIG. 6(a) is a query automaton for a stream search generated by a compiling device in response to an XPath expression given by //p[not(ancestor::div)], which is a query expression for searching ""p" node without "div" node in the upper stream" when described conventionally. A query automaton shown in FIG. 6(a) is an automaton for performing actions of assigning a state 0, which is not a search state, to a node where no "p" is established, i.e. whose tag name is other than "p", and also assigning a state 2, which is not a search state either, to a descendant node of "div" (a node corresponding to "descendant" axis when it is seen from "div"). In other words, a node whose tag name is other than "p", or a node that is not a descendant node of "div" (a node having "div" as its ancestor) is not searched, and only a node corresponding to //p[not(ancestor::div)] is searched. A query automaton can evaluate an XPath expression //p[not(ancestor::div)] because the present invention uses information obtained from a left node and information obtained from a lower node for a state transition concurrently. In other words, in the present invention, by using both of horizontal information and vertical information concurrently for a state transition, every axis regarding sibling relationship among nodes can be included in a search condition. As a result, "following-sibling", "preceding-sibling" or the like which cannot be evaluated in a conventional stream search for performing a search of an XPath expression can be treated enough.

A query automaton has already been proposed in Neven (F. Neven, Design and Analysis of Query Languages for Structured Documents, PhD Thesis, Limburgs Universitair Centrum, 1999) and the like. Neven's method studies characteristics of a query automaton and the like without suggesting applicability of a query automaton to a stream-based document-searching system and its specific arrangement. The Neven's method neither suggests an arrangement provided in the present invention that defines a search state with two states of an input included concurrently in a state transition.

By using a query automaton according to the present invention, a conjunctive XPath expression, //d[.//div and .//p], for example, can be used as a query expression, which was impossible in prior arts. A query automaton shown in FIG. 6(b) is an automaton to act for assigning 0, which is not a search state, to every node which is not "div" itself and whose descendant is not "div" either, or every node which is not "p" itself and whose descendant is not "p" either. In other words, any node which has no "div" as its descendant and any node which has no "p" as its descendant are not searched, and only a node corresponding to //d[.//div and .//p] is searched. In any case, the present invention can define a new search state "*" by determining a type of backward node for the above-mentioned query automaton and including the state in a state transition by a query automaton. This is because in the present invention, a couple of (1) a state immediately before an opening tag of a current node and (2) a state of lower node of a current node can be used for a state transition by including a relationship between an opening tag and a closing tag in an evaluation. In more general terms, this is based on an essential configuration of the present invention, which is for "calculating a state of a current node by locating a plurality of backward nodes and using a plurality of states associated with the backward nodes".

Figure 7:
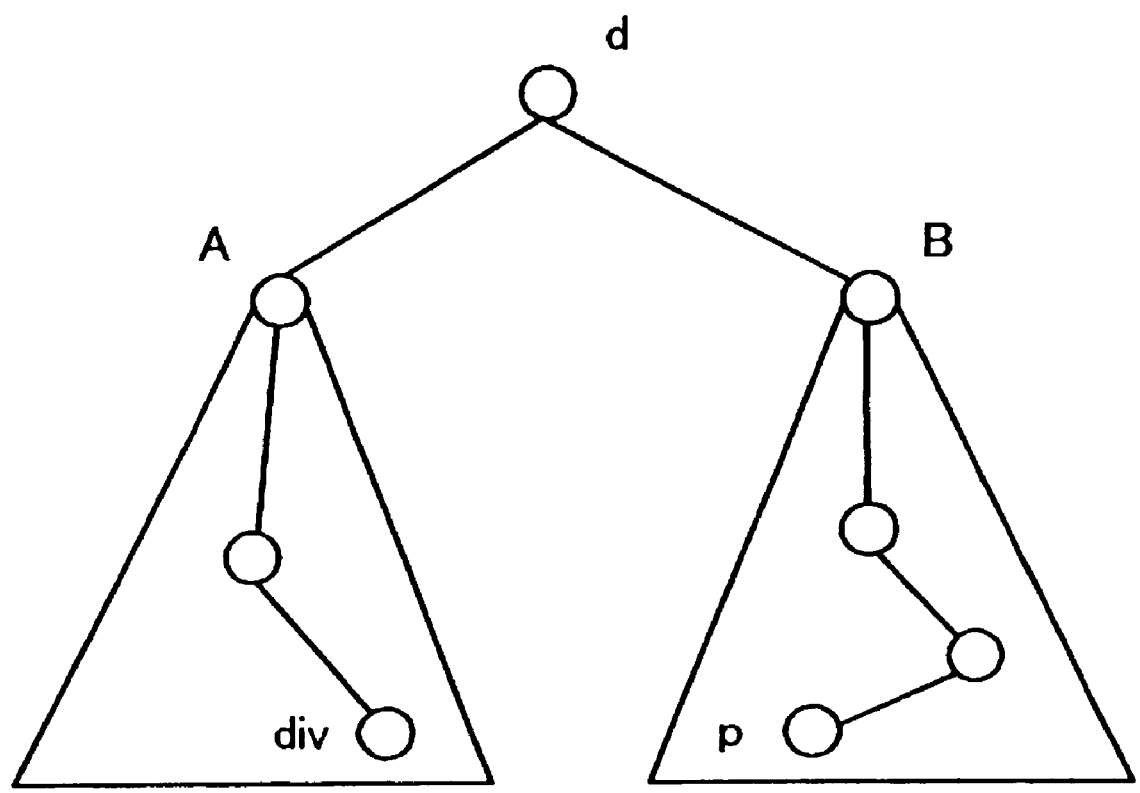
FIG. 7 is diagram showing an essential principle of the present invention by illustrating a search path in the case that the principle is applied to an evaluation of a conjunctive XPath expression, //d[.//div and .//p]

FIG. 7 is a diagram showing the above-mentioned essential principle of the present invention by illustrating a search path in the case that the principle is applied to an evaluation of a conjunctive XPath expression //d[.//div and .//p]. As it is shown in FIG. 7, a situation of searching for a certain node "d" that has both "div" and "p" nodes under it will be studied. In FIG. 7, "div" node and "p" node belong to different subtrees A and B, respectively. In the embodiment shown in FIG. 7, so-called conjunction (and), which indicates that [.//div] is established in one of trees A and B and [.//p] is established in the other tree, needs to be checked to obtain information indicating that both "div" and "p" nodes exist under "d" node. Conventional techniques relating to a stream search of an XPath also perform an operation of propagating information obtained from trees A and B to node "d" by combining each piece of the information. In those cases, only information indicating one of two conditions is established, such as whether [.//div] or [.//p] exists (disjunction:or) is established, is propagated in order to perform an evaluation along with a tree structure. The present invention uses a configuration for causing a transition when states of a plurality of backward nodes are combined and only if the combination matches an entry of a state transition. Thus, the present invention can equally pass an evaluation result of a condition that should be established in any one of backward nodes (disjunctive condition) and an evaluation result of a condition that should be established in all backward nodes (conjunctive condition) onto a forward node.

2. Query Automaton Evaluator

As mentioned above, in the present invention, a query automaton takes a state of a query automaton evaluator as a search state. A query automaton evaluator temporarily stores an inner state of a query automaton evaluator at the moment of interpreting an input stream in response to a state of each node obtained by interpreting the input stream, while performing an evaluation of a query automaton by using the input stream. A query automaton evaluator is configured to perform determination of a stored inner state by classifying it into left and lower nodes and store the determination, to label an inner state of what is transited as a search state, and when a node agreeing with an XPath expression is searched, to store the node in storage device 20.

Figure 8:
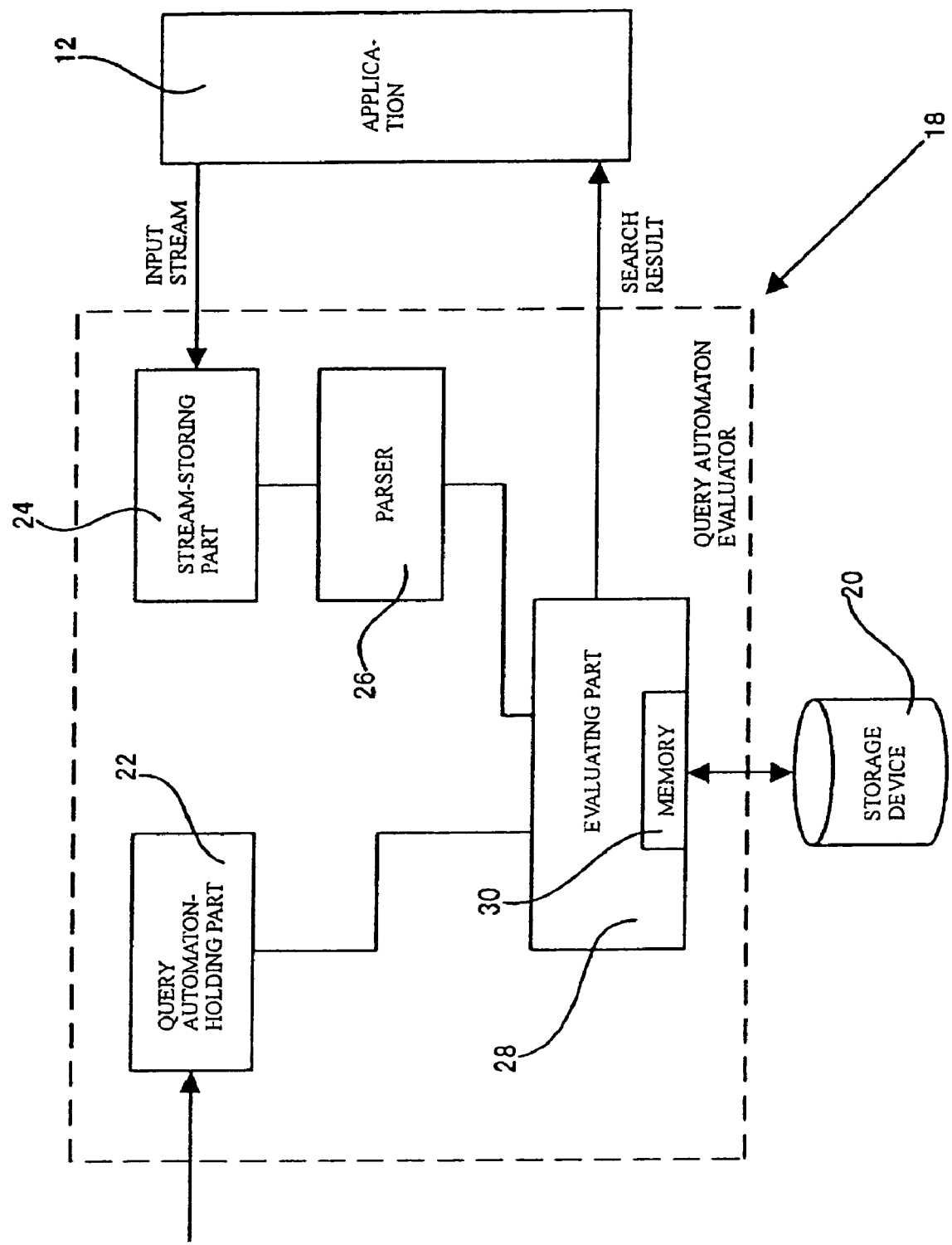
FIG. 8 is a detailed functional block diagram of a query automaton evaluator 18 according to the present invention.

FIG. 8 is a detailed functional block diagram of a query automaton evaluator 18 according to the present invention for implementing the above-mentioned functionality. The query automaton evaluator 18 is generally configured by including a query automaton-holding part 22, a stream-storing part 24 for temporarily storing an input stream, a parser 26 for parsing by reading out an input stream stored in stream-storing part 24, and an evaluating part 28 for evaluating a query automaton by using a table held in query automaton-holding part 22 and each tag obtained by parser 26.

Evaluating part 28 identifies an element identifier indicating a closing tag or an opening tag from an input stream, determines a backward node, determines a state of the determined backward node by using a query automaton, and generates a state transition including a search state "*" by using the determined result. If evaluating part 28 determines that the state is transited to a search state, it temporarily stores the state and a node that caused the state transition in memory 30, and performs an evaluation of a next tag obtained from an input stream in time. The evaluating part 28 is configured to output a search node that is output to memory 30 to storage device 20 and store a node that is considered to be in search state until all the evaluations are completed for an input stream. In another aspect of the present invention, storage device 20 may be placed in application 12 shown in FIG. 1 instead of being provided in query automaton evaluator 18. However, application 12 itself is not a purpose of the present invention. Therefore, aspects other than those stated above will not be described in detail in this specification. When an evaluation of an input stream is completed, data on a set of stored nodes is passed onto application 12 as a search result for an XPath expression input by application 12.

That is to say, a query automaton evaluator according to the present invention is configured to receive 1 an input stream and 2 a query automaton as an input. Similar evaluating devices have been proposed in a prior art, though they do not use a configuration used in the present invention for evaluating a query automaton configured by using two inputs and by including a search state.

Figure 9:
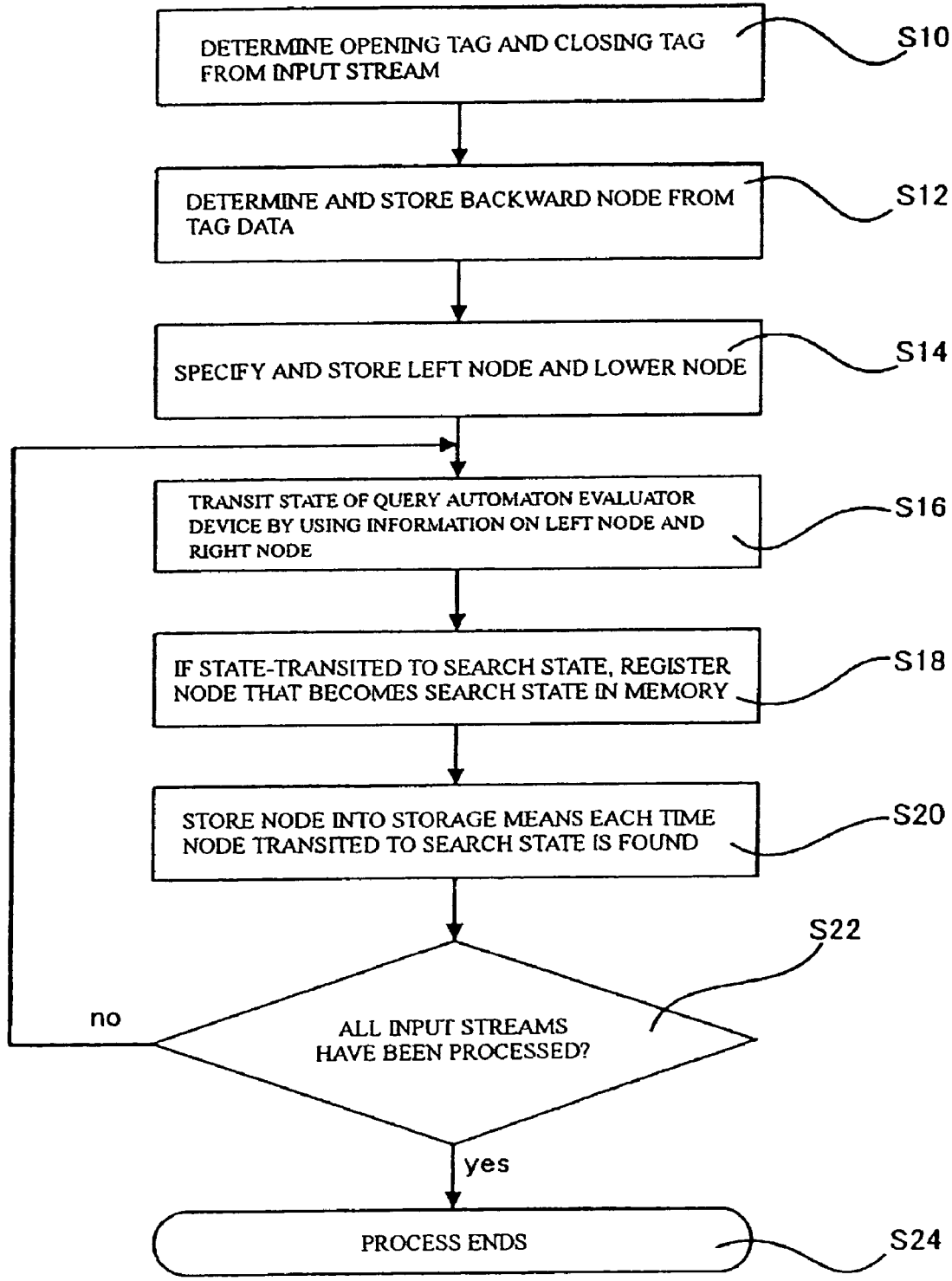
FIG. 9 is a brief flowchart of a query automaton-evaluating method that is performed by a query automaton evaluator according to the present invention.

FIG. 9 shows a schematic flowchart of a query automaton-evaluating method that is performed by a query automaton evaluator according to the present invention. As it is shown in FIG. 9, in the method performed by a query automaton evaluator according to the present invention, a query automaton evaluator reads out a tag from an input stream and determines a closing tag and an opening tag among tags in step S10. At step S12, the device determines a backward node from the obtained tag data. At step S14, the device further determines a left node and a lower node. At step S16, the device performs an evaluation with a query automaton by using the left node and the lower node, and generates a state transition corresponding to each node. Specifically, the device calculates a state transition of a node under evaluation at the moment by reading out an immediately-before state of an opening tag under evaluation at the moment and a state of a lower tag under evaluation at the moment.

Figure 10:
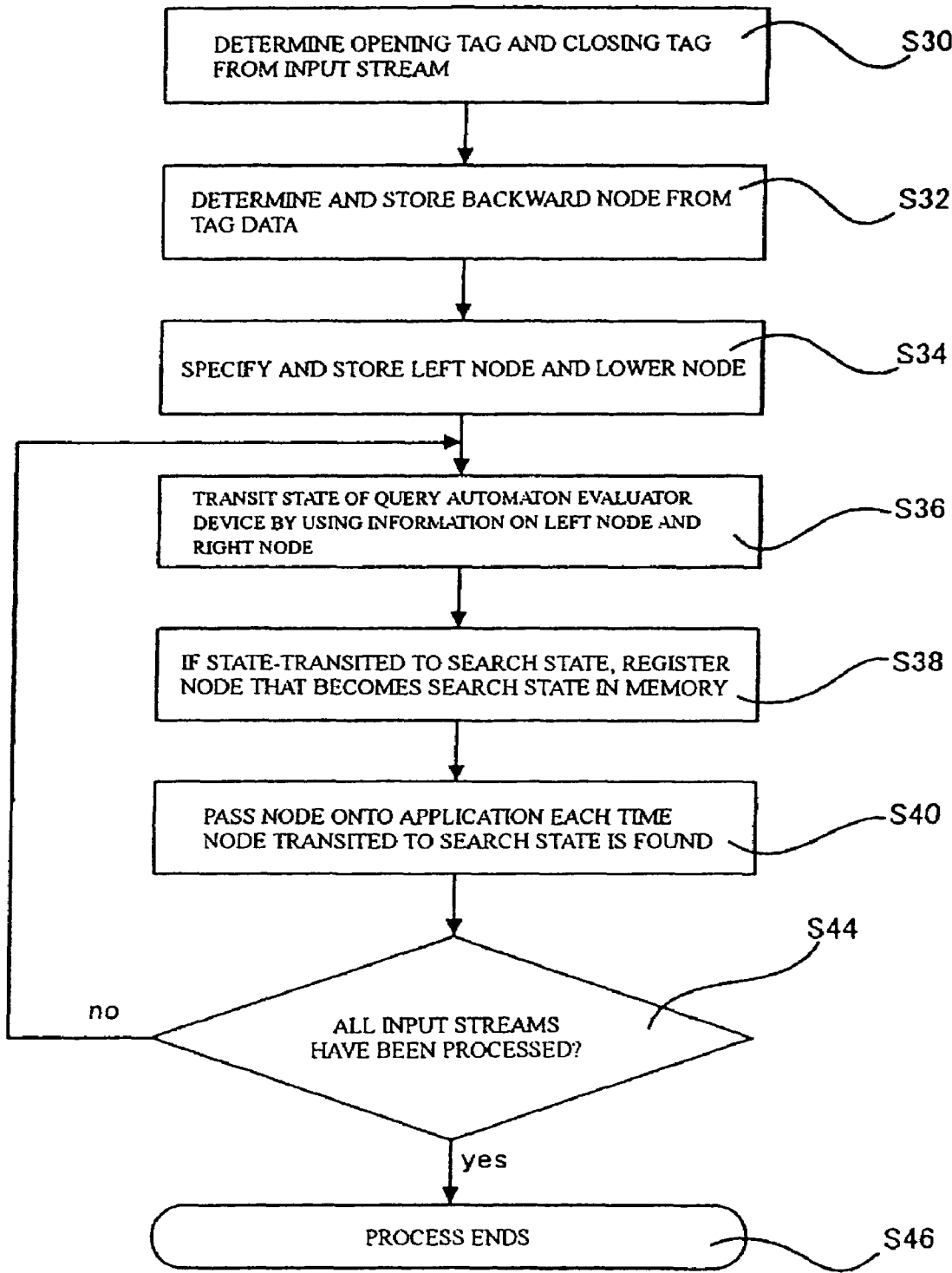
FIG. 10 is a diagram showing an embodiment that performs serial output of search results in an evaluating method according to the present invention.

At step S18, if a state transition is a search state, the device then takes the node under evaluation at the moment to be searched and registers the node with a search state in memory, and clears node data stored until then from evaluating part 28. At step S20, the device registers a node in memory each time it finds a node transited to a search state. At step S22, the device determines whether all input streams are processed or not, for example, by detecting <//html> tag. If all input streams are determined to be processed, (yes), the process continues to step S24, where a node searched is output and the process ends. In this case, a search state registered along with the node can also be output along with a relative or absolute location on a tree structure for the node. If all input streams are not evaluated (no), the process returns to step S12 and repeats evaluation. FIG. 10 shows an embodiment that performs serial output of search results in an evaluating method according to the present invention. The embodiment according to the present invention shown in FIG. 10 uses a configuration that serially outputs a node transited to a search state at step S40 instead of storing a node transited to a search state in memory.

In the method according to the present invention, a transition is caused in a forward node by using multiple pairs of states, for example, a left node and a lower node. Multiple pairs of states that can be used as an input state in the present invention are unlimited. For example, a combination of two conditions that is hard for a conventional evaluating method for an XPath expression to evaluate, such as where .//div as well as .//p is established, can be determined. Now, operations of a query automaton evaluator according to the present invention will be described more specifically by referring specifically to processing steps for searching the simplest ".//p". In the embodiment described below, a stream search is performed by using a query automaton corresponding to ".//p" (see FIG. 5) where an input stream is <html>aa</html>. Execution steps for a query automaton evaluator are as follows. "<html>" has no tag on the left. Thus, a state immediately before the opening tag is initial state of 0, 1. "<html>" has no backward node of the left either. Thus, a state immediately before the opening tag is initial state of 0, 1. Text "aa" is present under the opening tag. Thus, a state of the text node is still an initial state of 0, 1 in this situation.

When </P>is detected by the query automaton evaluator, it is apparently known that a state of a left node of node "p", i.e., an immediately-before state of the opening tag, and a state of a lower node can be 0,1, because the query automaton evaluator stores a state of an opening tag, which has been evaluated. A condition for transition "Øp" is not met but a condition for transition "any" is met at this moment. Thus, the device transits to a reached state 1 by applying a state transition on the second line of a query automaton shown in FIG. 5. As the reached state 1 at this moment is a search state "*", the fact that node "p" has been searched is output to memory.

Then, the fact that a state of a left node of "html" node is 0,1 when </html> is input into a query automaton evaluator, and the fact that a state of a lower node is 1 are read out from memory. "html" node satisfies both of a condition for transition "Øp" and a condition for transition "any", and transits to a reached state of 0,1. This "html" node does not transit to a search state even it becomes a reached state 1, and simply a final state. Thus, only the nodes searched in all reached states are output. With the above-mentioned process, only a "p" node is output.

In the particular embodiment in the above description, a query automaton "outputs only the nodes searched in all reached states". However, in the present invention, another query automaton can be implemented "which outputs only the nodes searched in any one node in a reached state" as described below.

3. A Compiling Device for Generating a Query Automaton

Figure 11:
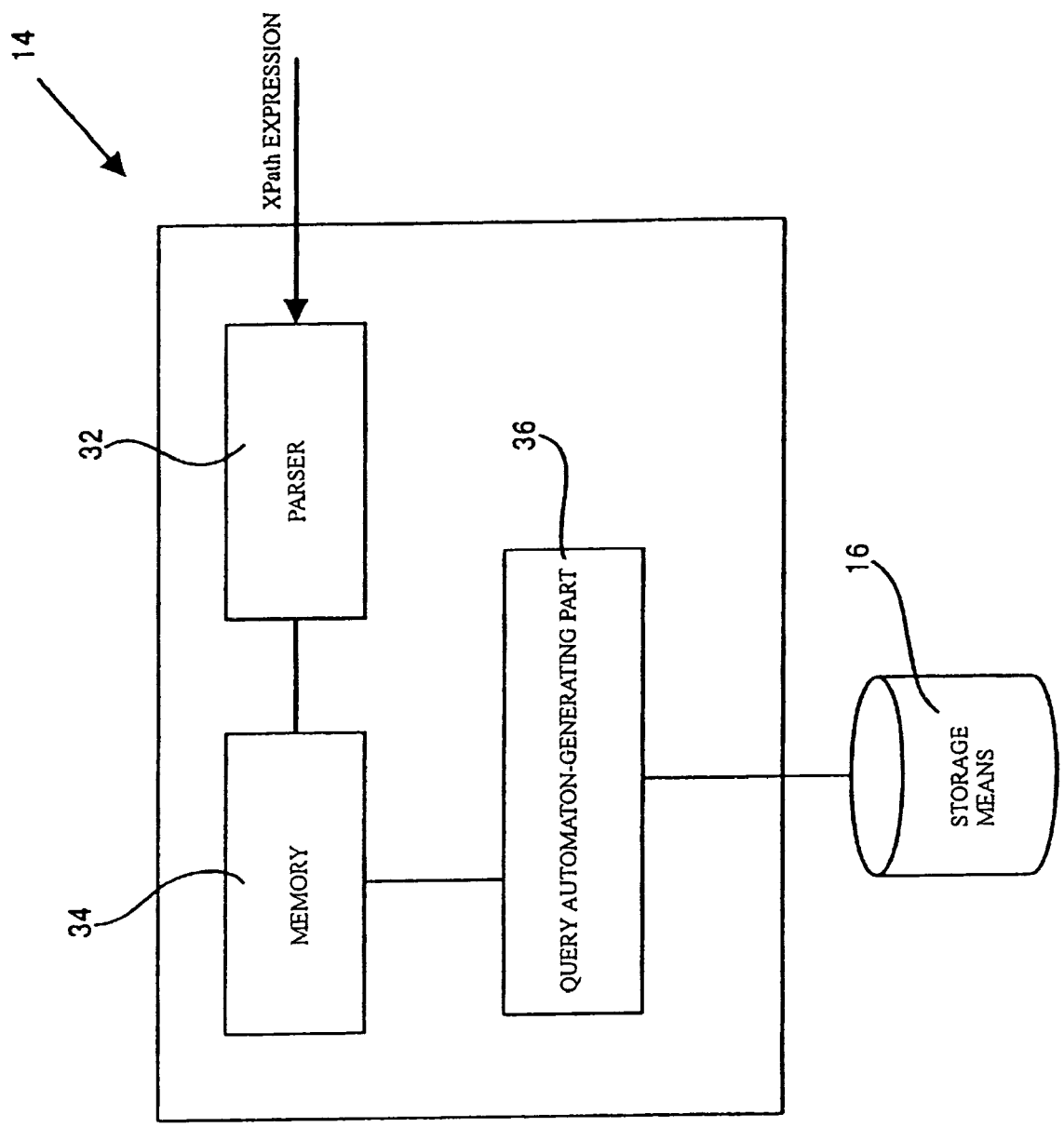
FIG. 11 is a detailed functional block diagram of a compiling device for generating a query automaton according to the present invention.

A compiling device for a query automaton according to the present invention has functionality of generating a transition state table, which represents a query automaton equal to an input XPath expression (query automaton), and storing the automaton in storage device 16. FIG. 11 shows a detailed functional block diagram of a compiling device for generating a query automaton according to the present invention. A compiling device for generating a query automaton shown in FIG. 11 is configured by including a parser 32, memory 34 for holding a syntax generated in parser 32 and various logics, and a query automaton-generating part 36 for generating a combination of states to be included in a query automaton by reading out data stored in memory 34. Query automaton-generating part 36 outputs a generated query automaton to storage device 16 in an appropriate form.

A compiling device for a query automaton according to the present invention performs replacement described below on an input XPath expression, with their semantical equivalence. When a form of the XPath expression finally is a form, which can be considered as a transition of a query automaton, the device stores the XPath expression in storage means as a transition of an automaton.

(1) Replacement of an axis in the forward direction that is exemplified as axis "child, descendant" in an XPath into a state transition.

(2) Replacement of an axis in the opposite direction that is exemplified as axis "parent, ancestor" in an XPath into a state transition.

(3) Replacement of an axis in the direction of sibling in an XPath (following-sibling, preceding-sibling) into a state transition.

(4) Replacement of a predicate of an XPath into a state transition.

(5) Replacement of a logical product (and) of a predicate of an XPath into a state transition.

(6) Replacement of a logical add (or) of a predicate of an XPath into a state transition.

(7) Replacement of a logical NOT (not) of a predicate of an XPath into a state transition.

Figure 12:
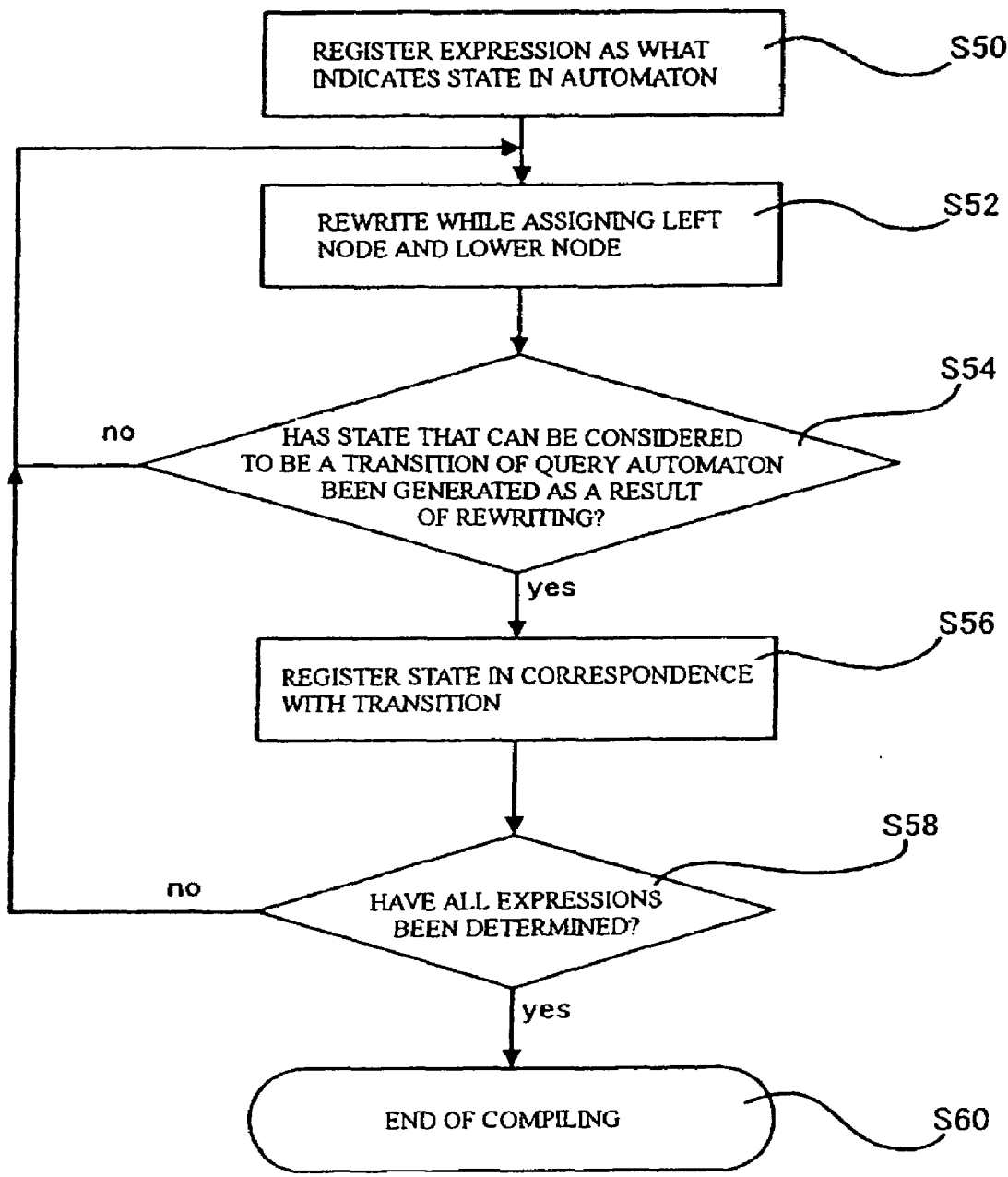
FIG. 12 is a flowchart of a compiling method that is performed by a compiling device according to the present invention.

Processes performed by a compiling device according to the present invention will be described below. FIG. 12 is a flowchart of a compiling method that is performed by a compiling device according to the present invention. In the compiling method according to the present invention, a compiling device registers an XPath expression or a query expression, which is a slightly extended XPath (hereinafter generally called "an expression"), as a state in an automaton at step S50. At step S52, the device rewrites the expression into a form easier to be processed by a compiling device, for example, into a BTLP form and registers it. At step S54, the device determines whether a form that can be considered as a transition of an automaton is generated or not as a result of the rewriting. When it is determined that a form that can be considered as a transition is generated (yes), it is stored in correspondence with a transition in an XPath expression at step S56. At step S58, the device determines whether all the expressions are converted or not. If all the expressions are determined (yes) at the determination of step S58, it indicates that all elements of the expression are translated in correspondence with a transition of an automaton. Then the device puts the process to an end at step S58. When all the expressions are not determined (no), the process returns to step S52, where the device performs rewriting again and repeats conversion until all elements of the expression are translated in correspondence with a transition of an automaton.

In the present invention, so-called "expression" can be represented by using a tree structure in a machine. As a manner to construct an automaton by repeatedly rewriting an expression, an algorithm, for example, disclosed in Gerth, D. Peled, M. Y. Vardi, and P. Wolper, "Simple on-the-fly automatic verification of linear temporal logic.", Protocol Specification Testing and Verification, pages 3-18, 1995 is known. A query automaton evaluator and a compiling device for generating a query automaton described above cause a computer to function for providing each function by being implemented as a program in a computer. Now, processes of a query automaton evaluator and a compiling device according to the present invention, both of which are implemented in a computer, will be described in detail by using a pseudo-code.

C: Implementation of a query automaton evaluator, a query automaton and a compiling device Now, implementation of a query automaton evaluator according to the present invention will be described by using a pseudo-code and processes performed with the pseudo-code. The present invention describes by using a BTLP expression as a general "query expression" including an XPath expression and the like. The description of the embodiment below uses definitions shown below for notation and terminology.

Value: pseudo-codes and values described below follow definitions below.

<XML/XML stream>

This means a "query expression" and a document defined by a BTLP expression or other BNF syntax. A BTLP expression will be defined by a BNF syntax described below.

All expressions defined by BNF syntax including a BTLP expression can be represented by using a tree structure in a machine. "Two expressions are equal (=)." means that the expressions are equal in terms of syntax, or their tree structures are equal in structure.

<Value of Integral Type>

A state of an automaton is provided on a machine as a collection of integer values, when identification codes, such as codes 1 to 3 shown in FIG. 5, are attached to a corresponding state, using a numerical as the codes. An identification number can be given for other values of an expression by using a hash table in accordance with the equality in syntax, which can be represented as an integer value and registered in a machine. They can be registered in any combination for use.

Pseudo-code: definition of an operation and an instruction in a pseudo-code

<Set Operation 4 3 #>

This means sum, product, and difference for each set. A set is assumed to be finite in the present invention. A method for representing a finite set in a machine and performing a set operation is known to be able to use various arrangements such as an ordered list, a hash table, a bit set. In the present invention, any conventional implementation can be used.

Predicate Logic: ", $, $P$, ., -, Ø

In a pseudo-code according to the present invention, predicate logic is used for a conditional description of an intensive notation of a set and a conditional description of an "if" sentence.

A universal quantifier " is used as "x.P(x), where x is a bound variable and P refers to any predicate. In order to evaluate this universal quantifier in a computer, it corresponds to processes of checking the entire region of values that a loop can give "x", and checking whether P(x) is established for all "x" or not.

An existential quantifier $ is used as $x.P(x), where "x" and "P" have the same meaning as that of a universal quantifier. In order to evaluate this existential quantifier in a computer, it corresponds to processes of checking the entire region of values that a loop can give "x", and checking whether P(x) is established for all "x" or not. In the present invention, a region of values that a variable bound by a universal quantifier " or an existential quantifier $ is assumed to be finite.

., -, Ø, $P$ mean conjunction, disjunction, negative, and implication, respectively. P.Q determines whether P and Q are established together. P-Q determines which of P and Q is established. ØP determines whether P is established or not. P $P$ Q determines whether P is established or not, or whether Q is established or not.

Extensional notation {x1, ..., xn} and intensional notation {f(x1, ..., xn)IP(x1, ..., xn)}: An extensional notation enumerates a set of bound variables. An intensional notation initially determines a tuple of all values that bound variables, x1, ..., xn, can take by using nested loop, and determines whether P(x1, ..., xn) is established or not for each tuple. When it is determined to be established, a value is obtained by evaluating f(x1, ..., xn) and the obtained value is added to a set of results. In this order, the values can be stored as an internal expression of a finite set.

Tuple <>:

A tuple means a collection consisting of several elements. The elements may have various types. <1, "string"> or <2, "abc"> refers to a tuple. A tuple can be provided in a structure such as "struct" of "C" or a class of "Java$^O$".

Cartesian Product':

A Cartesian product means an operation between sets. This is an operation to return a set consisting of all tuples of values read out from both sets, such as {1,2}×{"string", "abc"}={<1, "string">, <1, "abc">, <2, "string">, <2, "abc">}. A Cartesian product A×B can be generated by arranging every element of A and B with a double loop structure, generating and registering each tuple of elements, and adding each tuple to a set of results.

"proc" Declaration and "return" Sentence:

In the embodiment according to the present invention described below, all pseudo-codes use a definition of procedure with a recursive call. A "proc" declaration performs a definition of declaration of procedure and an argument. A "return" sentence returns a return value. These mechanisms can be provided by using a programming language such as an existing C or Java$^O$.

"case" sentence: A "case" sentence performs a pattern matching against an expression defined by a BNF syntax, and the like. Expression "a" represented by

```
a, b, c::=a+a
       |a−a
       |(a)
       |n,
``` where "n" is an integer value, can be enumerated such as 0, (0-2)+1. Pattern matching with a "case" sentence performs branch processing according to a form of an expression, for example, receives an expression "a" and:

```
case a
  b+c -> ...
  b-c -> ...
    (b) -> ...
    n -> ...
      otherwise -> ...
esac
```

In the above-mentioned case, if "a" is in the form of "b+c", for example, (0-2)+1, substitutions such as b=(0-2), c=1 are performed, and "..." part is executed. If "a" is (0-2) in the form of (b), "..." part is executed, as "b=0-2". When no match exists, the "otherwise" part is executed. A mechanism such as a "case" sentence exists, for example, in a function type language such as ML, which is disclosed in "SML/NJ (http://cmcell-labs.com.cm/cs/what/smlnj/)". The same function can be provided by using other languages.

"for" sentence:
"for" sentence with a typical programming language
"if" sentence:
"if" sentence with a typical programming language
substitution sentence=:
a substitution sentence with a typical programming language Fixed-point calculation: A "compiling method for query automaton" of an embodiment described below in the present invention is a fixed-point calculation algorithm. A fixed-point calculation refers to an algorithm that performs a loop calculation by monitoring a set and the calculation ends when the plurality of elements of the set no longer increase. To see if there is no more change in contents of the set, equal two elements should not be included in a set. This is especially important where a value is an expression. It is easier for a machine to treat a set of integer values than to treat a set of expressions. Therefore, an approach is also possible which attaches a unique identification number to an expression by using a hash table and considers a set of the identification numbers as a set of expressions without representing a set of expressions directly by the machine.

Figures 13, 14, 15:
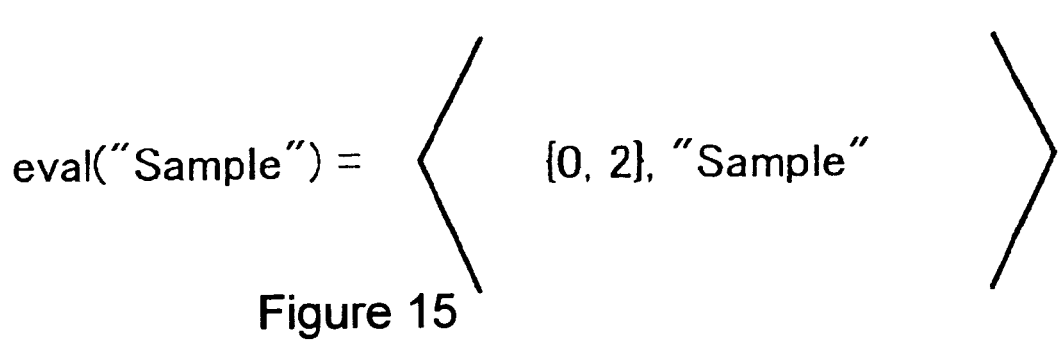
FIG. 13 is a diagram showing a pseudo-code that can be implemented in a computer as a query automaton evaluator according to the present invention.
FIG. 14 is a diagram showing an embodiment of an XML document that is input to a query automaton evaluator.
FIG. 15 is a diagram showing an embodiment of a returned value generated by the above-mentioned functionality of a function "eval"

FIG. 13 shows a pseudo-code that can be implemented in a computer as a query automaton evaluator according to the present invention by using the above-mentioned definition. As it is apparent from the pseudo-code shown in FIG. 13, a query automaton evaluator can be provided by using a recursive call function "eval". A function "eval" receives an XML stream "v" as an input and performs a process. A query automaton is provided as <Q, δ, I, θ> in the pseudo-code shown in FIG. 13. A query automaton is used as a global variable.

1. Implementation of Query Automaton Evaluator

Now, processes of a query automaton evaluator according to the present invention will be described in conjunction with a pseudo-code along the processes shown in a flowchart in FIG. 9.

(a) Processes of "reading a tag from a stream" and "repeating until all streams are read in": How these processes are implemented by a pseudo-code will be described. Into a query automaton evaluator described below, an XML document shown in FIG. 14 is input. The input XML document is analyzed by pattern matching. Consider a case where a query automaton evaluator reads in an input stream shown in FIG. 14. In this case, pattern $u<\sigma>v</\sigma>$ will be met. In this pattern, "u", "v", and "σ" are variables. If an input stream matches the above pattern,
u=<head><title>Sample</head>
v=A paragraph
<div>A paragraph in div
</div>
σ=html a process is performed as a partial stream corresponding to each variable. In the above expression, a variable "u" is a left node when it is seen from "html" node, and a variable "v" corresponds to a lower node. For example, <head><title>Sample</title></head>can also be matched to the above pattern. In this case,
u=""
v=<title>Sample</title>
σ=head, where "" indicates a null string. A null string is used because no element exists before "head" tag.

From the second to the sixth line of the pseudo-code, operations are performed that an input stream is decomposed and read in by repeating a pattern matching. Specifically, a stream "v" provided to a function "eval" is decomposed by a pattern matching in the third line into "u" and "w", and an evaluation is recursively performed with "eval". When the input stream is decomposed to a character string "s" (for example, "" or "Sample"), it is assumed to match a pattern in the fourth line of the pseudo-code.

In evaluation of the third line of the pseudo-code, "w" part of a lower node need not be read from an input stream to calculate eval(u). In order to calculate eval(w), information on a left node "u" may be discarded. With the above processes, a function "eval" can complete a process with good memory efficiency by evaluating an input stream from left to right only once.

(b) A process of "performing a state transition by using information on an opening tag or a closing tag": How this process is implemented by a pseudo-code will be described below.

A function "eval" uses a query automaton <Q, δ, I, F, θ> as a global variable. Set Q is a set of states, set I is a set of initial states, set F is a set of final states, set Q is a set of search states, and d is a transition function. For example, a query automaton corresponding to an XPath expression shown in FIG. 5, .//p[not(ancestor::div)] is represented as a global variable of an expression below on a pseudo-code. Each set of states is provided by an expression below.

Q={0, 1, 2, 3}

I={0, 1, 2}

F={0, 1, 3}

θ={1, 3}

In the above expression, Q is a set of all states, and I, F, Q are sets consisting of states in types of I, F, "*", respectively. A transition function s is a function which receives tag name s, a state of a left node q1, a state of a lower node q2 as arguments, searches a table of a query automaton, and returns a set of states of what is transited. A function δ evaluates with δ(body, 0, 0)={0, 1}

δ(p, 0, 1)={1} and returns the evaluated value. In other words, an entry for a table where a condition for transition accepts "body" tag and both a left node and a lower node are in state 0 is in the first and second lines of a query automaton and returns 0 and 1 for the values of a reached state, respectively. An entry for a table where a condition for transition accepts "p" tag and a left node is state 0 and a right node is state 1 is in the second line of a query automaton, and returns a value of a reached state 1.

The above-mentioned query automaton-evaluating step corresponds to a calculation of a state transition d(s, q', q") in the third and fourth lines of a function "eval". Here, "q'" indicates a result of executing "eval(u)" for a left node "u", and "q''" is a result of executing "eval(w)" for a lower node "w". A tag name s is a tag name for a node under evaluation at the moment that is retrieved by the above mentioned pattern matching.

(c) A process of "if a state transited is a search state, storing that the state has searched the current node" and a process of "on transition, storing every node that is stored to have been searched in a state of what is transited": The processes correspond to the sixth, seventh, and eighth lines of a function "eval". Both of the above-mentioned processes will be described together below.

A variable Ξ appearing in the pseudo-code is a variable for storing a result of a function "eval". A result of a function "eval" is used for storing a node selected in accordance with a state for each state. At first, the current result variable Ξ is read out by "for" sentence on the sixth line. When "if" sentence on the seventh line determines that a search state q(Î θ) is included there, this is provided by registering {<q, V,U{v}>}, to which the current node "v" is added, to a result variable Ξ. For example, consider a case where a function "eval" reads in "v=A paragraph" as a partial stream of an input. It is assumed that a result variable includes a pair of a state <1, { }> and a search node. In other words, no node has been searched in a state 1 until then, but as 1 is a search state (1 ∈Ξ), a new pair <1, {A paragraph}> is added to a result variable Ξ by executing the seventh line.

Now, a process of "on transition, storing a node that is stored to have been searched, in a state of what is transited" will be described, with description of former processes of the pseudo-code. Operations of the third and fourth lines of the pseudo-code are operations of: when a certain state "q" is given, determining a collection of node "x"s that meet a condition of a following expression for all "q'" and "q''", which is d(s, q', q'')=q, for "q'" and "q''" appearing in <q', x> Î eval(u) and <q'', x> Î eval(w), respectively, for a left node "u" and a lower node "w".

(Condition) ∃V×x∈VΛ. (<q', V) Î eval(u)-<q'',
V>∈eval (w))

The above expression means a process of returning a set of node "x"s", which is searched in any transition source for "q". A pair of an obtained set of "x"s" and a state "q" is added to a result set X. When "v" is "e" in the fifth line, a pair of each initial state and an empty set is added to X. More specifically, it is assumed that if
v=A paragraph
<div>A paragraph in div
</div> is read in as an input stream; s=div, and respective evaluation results for a lower node "w=A paragraph in div" of a left node "u=A paragraph" are such as
eval(u)={<1, {A paragraph}>, <2, { }>}
eval(w)={<1,{A paragraph in div}, <2, { }>}.

Here, a transition with d will be the following three combinations of expressions.

δ(div, 1, 1)={0, 1}

δ(div, 1, 2)={0}

δ(div, 2, 2)={2}

Here, the transition of the upper line in FIG. 5 must be the only way to transit to q=1. In other words, q'=1 and q''=1 can be the only cases. Here, "x" that meets ∃V.x∈V.(<q', V>Îeval (u)-<q'', V>)∈eval (w)) for q=1 will be both of "A paragraph" and "A paragraph in div". "q'=2" and "q''=2" can be the only cases to transit to q=2, though no "x" exists which meets a condition ∃V.x∈V Λ(<q', V>)∈eval(u)V<q'', V>∈eval(w)).

In order to transit to q=0, both of the first and second lines can be used. That is to say, only "x" that meets Vq', q''.<q', x>∈eval(u)-<q'', Vx>∈eval (w) is "A paragraph". This is because, "x=A paragraph in div" does not meet a condition in the case of q'=1 and q''=2. More specifically, V={ }, which can be obtained from <2, { }>∈eval(w), includes no "x". As a result,
Ξ={<0,{A paragraph }>, <1, {A paragraph , A paragraph in div }>, <2, { }>}can be obtained.

The present invention uses a query automaton that selects only the node, which can be selected by using either of the transition sources reaching state 0, i.e., q'=1, qq''=1 or q''=1, q''=2, as mentioned above. As it is already described, it is shown that a function "eval" can determine a set of pairs of a state and a set of nodes searched for a result set X, respectively. A process of "outputting a node searched, which is stored in each state" can be performed by outputting a set of nodes obtained by the pseudo-code of the expression below.

$$\{x|\forall q \cdot q \in F \Lambda < q, V > \in eval(v) \rightarrow x \in V\}$$

A process indicated by the above expression is an operation of outputting only an "x" searched in every set of nodes that is paired with a final state as it has already been searched.

To facilitate the understanding of the present invention, a functionality of a function "eval" will be described by illustrating an embodiment of a returned value of a function "eval" where an input stream shown in FIG. 14 is used to evaluate a query automaton shown in FIG. 6(a).

(i) At first, when a character string "Sample" (or "A paragraph", "A paragraph in div", "", etc.) is input into a function "eval", eval(ε)={<0, { }>, <2,{ }>} is obtained. FIG. 15 shows an embodiment of a returned value generated by the above-mentioned functionality of a function "eval". FIG. 15 describes that nothing has been searched even though a function "eval" read in "Sample" and it was transited to states 0,2.

Figure 16:
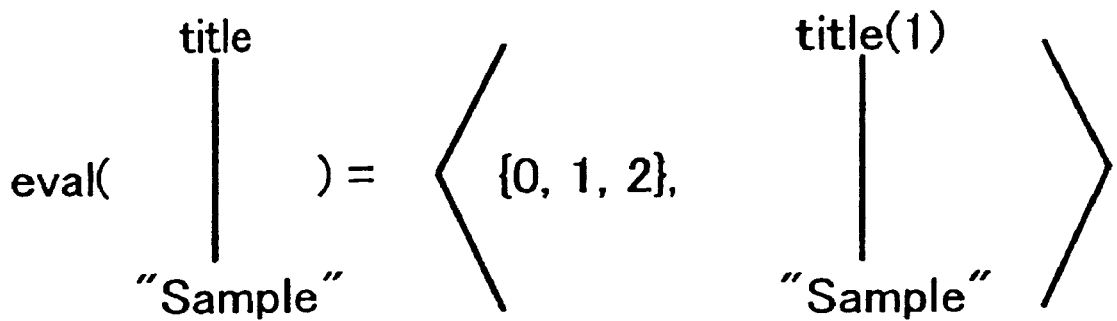
FIG. 16 is a diagram showing an embodiment of a returned value generated by the above-mentioned functionality of a function "eval"
Figure 17:
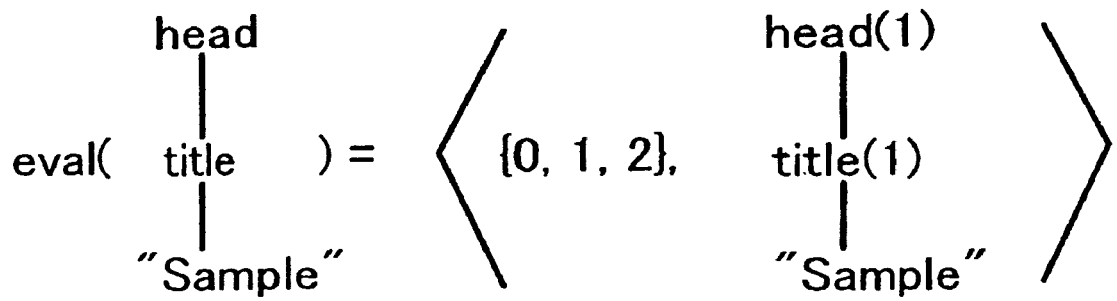
FIG. 17 is a diagram showing an embodiment of a returned value generated by the above-mentioned functionality of a function "eval"

(ii) Now, a process of a function "eval" for <title>Sample</title> will be shown in FIG. 16. FIG. 16 shows that a "title" node has been searched in state 1, after transited to states 0, 1, 2. For this reason, FIG. 16 shows a result consisting of three pairs, <0, { }>, <1,{<title>Sample</title>}>,<2, { }>. A result shown in FIG. 16 is returned because a transition to search state 1 occurred as a result of an input state 0 from a left node "" and an input state 0 from a lower node "Sample". A result shown in FIG. 17 is returned for <head><title>Sample</title></head>.

Figure 18:
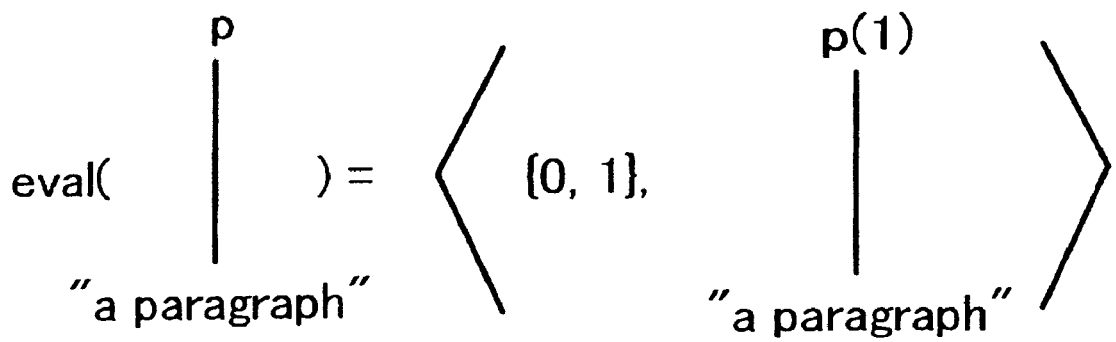
FIG. 18 is a diagram showing an embodiment of a returned value generated by the above-mentioned functionality of a function "eval"
Figure 19:
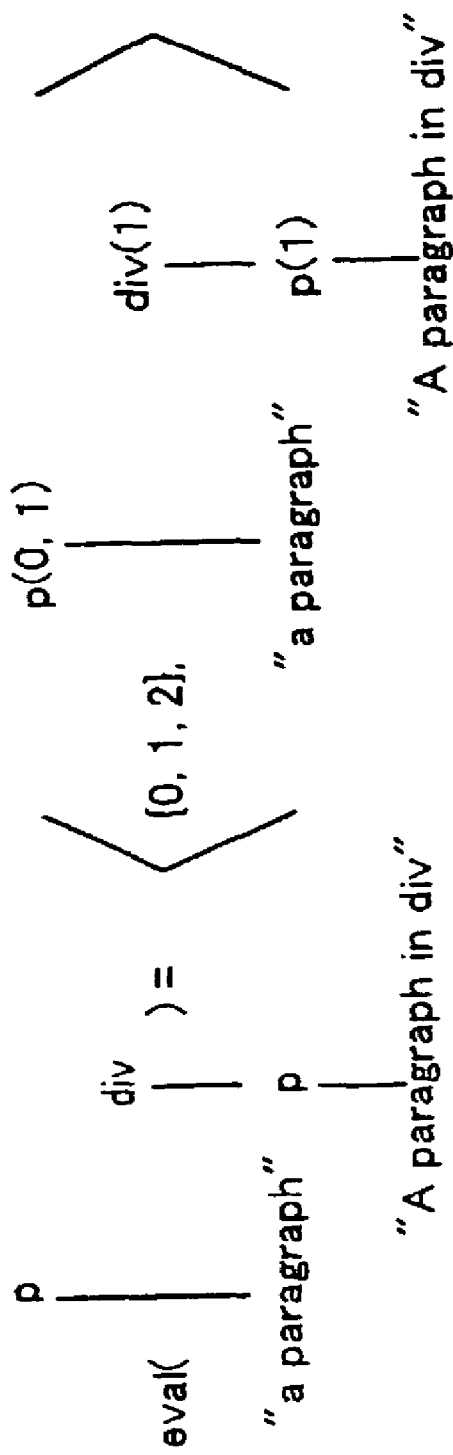
FIG. 19 is a diagram showing an embodiment of a returned value generated by the above-mentioned functionality of a function "eval"
Figure 20:
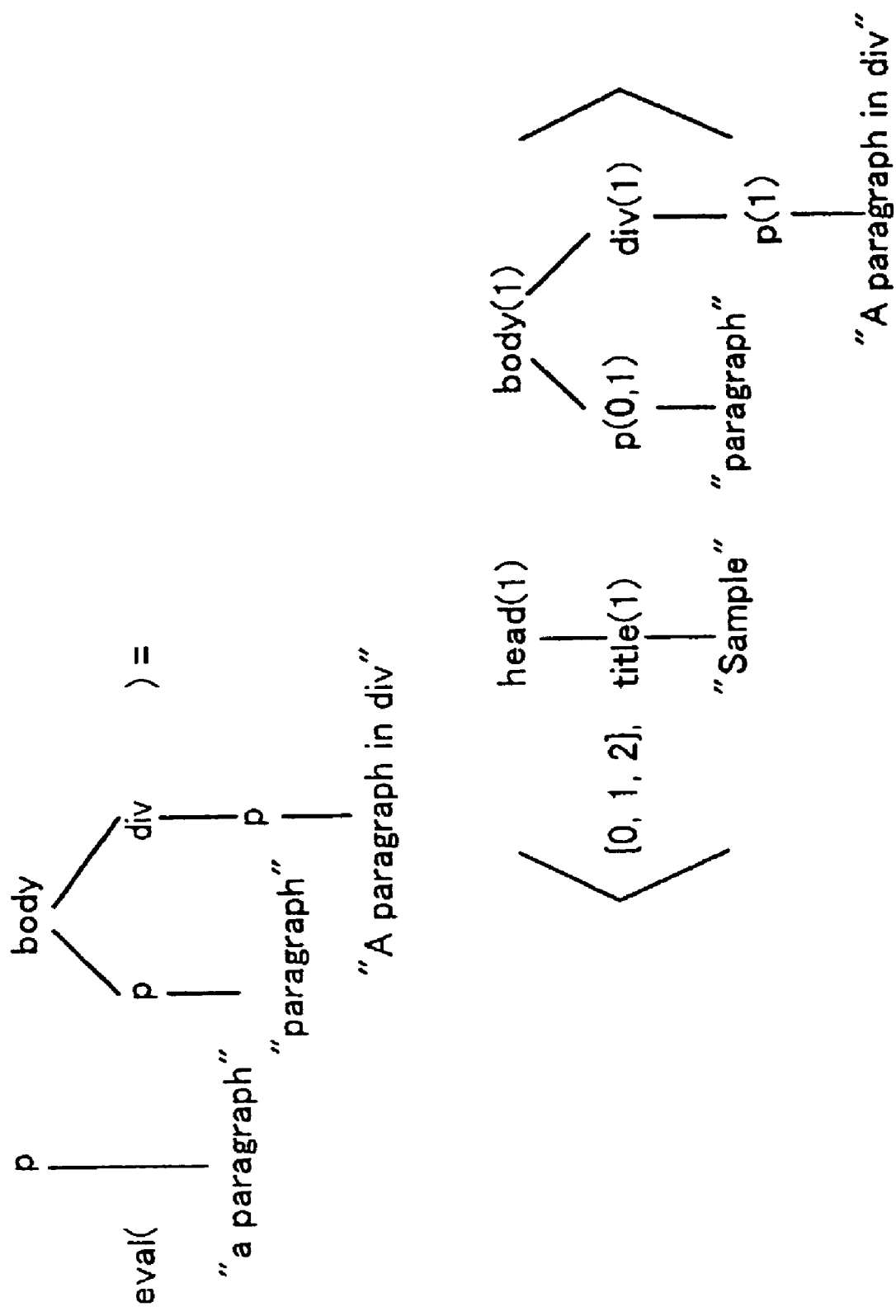
FIG. 20 is a diagram showing an embodiment of a returned value generated by the above-mentioned functionality of a function "eval"

(iii) FIG. 18 shows a result generated for "A paragraph" or "A paragraph in div" where it further moves to a "body" tree shown on right and subjected to further calculation. A result shown in FIG. 18 consists of pairs of <1, {A paragraph}>, <2, { }> and cannot make any transition because of a condition for transition, ㄱp for a state 0. For "A paragraph <div>A paragraph in div </div>", a result {<0, {A paragraph}>, <1, {A paragraph, A paragraph in div}>, <2, { }>} is returned as shown in FIG. 19.

(iv) FIGS. 21 and 21 show results obtained for "body" node and "html" node. A final state is F={0,1}. As a result, the first "p" node, to which 0, 1 are assigned at a node shown in FIG. 19 that is searched with both 0 and 1 by {x|"q. qÎF.<q,V>Îeval(v)ᵽxÎV}, will be finally searched.

An algorithm described above evaluates an XPath with a stream, reads a stream, and then outputs search results together. When it can be determined in the midway of evaluating a function "eval", that a reached state is {0,1,2}, and that a certain node is searched in a state 1 but not in a state 0 and that a transition from the current state 0 to a final state must exist, a node that is only searched in a state 1 can be determined that it cannot be searched. In the present invention, a search result can be output, while reading in a stream with the above-mentioned determination being taken into consideration, and information on a node that is not searched can be deleted in the earlier stage to accomplish an efficient use of a hardware resource.

2. Implementation of a Compiling Device

A compiling device according to the present invention takes an XPath or a query expression, which is a slightly extended XPath (hereinafter simply called "an expression"), as a state of an automaton. When the expression is in a form, which can be considered as a transition of a query automaton through rewriting, the device translates the expression to a transition of an automaton and performs a process of repeating translation until every modal logic expression is translated to a transition of automaton through a rewriting. In the embodiment of implementing a compiling device according to the present invention to a computer, which will be described below, a BTLP expression, which is an extended XPath expression, will be used as an expression for description. In the present section, a pseudo-code will be written in BTLP expression, which is an internal expression of XPath. A BTLP expression f can be described in BNF grammar shown below.

b::=−1|−2
m::=b|1;2|−1;−2
φ::=a|(b)|bφ|¬φ|φ∧φ|φ∨φ|[m]φ|<m>φ

A data structure representing an expression f complying with BNF grammar within a machine can use any known method. A basic mode b(=1,2,−1,−2) corresponds to treating an XML tree as a binary tree as below. FIG. 22 shows a structure of the above-mentioned binary tree, where 1 corresponds to "at an element on the left", 2 corresponds to "at an element of a youngest child", −1 corresponds to "at a parent element if it is a youngest child", and −2 corresponds to "at an element on the right".

For a node set indicated by "m", [m] and <m> refer to a mode indicating "anywhere within" or "somewhere within". Before describing [m] and <m>, meaning of a syntax to be used other than them will be described below.

x A character "a" is assumed to represent basic predicates of an XPath, such as name( )="table", and @titile="xxx".

x Position determination (b) indicates that a node is present at the place designated by "b". (1) for a certain node means that the node "has an element on the left", (2) means that the node "has a child element", (−1) means that the node "has an element on the right", and $({−2})$ means the node is "a youngest child and not a root". For example, in FIG. 22(a), (−1) is established at the place of ◎.

x b φ indicates that φ is established at the place indicated by b(=1, 2, −1, −2). When no node is present at the place indicated by "b" (i.e., when ¬(b) is established), bφ is assumed to be certainly established.

x φ∧ψ indicates that both φ and ψ are established.

x φ∨ψ indicates that either φ or ψ is established.

Considering "m" of [m]φ, <m>φ in the above-mentioned meaning of each operator, a basic mode b(=1,2,−1,−2) can be input into "m" of [m]φ, <m>φ. This case will be described at first.

x [b]φ indicates that φ is established at anywhere on a path that extends toward "b". For example, the fact that [−1]a is established at the place indicated by ◎ in FIG. 22 means that all of a node ◎ and its two sibling nodes indicated by ○ meet a basic predicate "a".

x <b>φ means that φ is established at any one place on a path that extends toward "b". For example, the fact that <−1>a is established at the above-mentioned place of a node T means that one among a node ◎ and its two sibling nodes indicated by ○ meet a basic predicate "a". There can also be a case of m=1;2, or m=−1;−2. FIG. 21 shows the case. In FIG. 22(a), 1;2 is a mode close to "descendant-or-self" of an XPath, with meaning of designating not only descendants but also following elements. −1;−2 is a mode to include meaning close to "ancestor-or-self" as shown in FIG. 22(b) and to designate not only a string of parent elements, which are passed on the way to a root, but also all the following elements of nodes on the way.

More specifically, in order to describe conversion to a query automaton of XPath, an existing algorithm will be used which is disclosed in P. Gerth, D. Peled, M. Y. Vardi, and P. Wolper, "Simple on-the-fly automatic verification of linear temporal logic.", Protocol Specification Testing and Verification, pages 3-18, 1995. For example, an XPath expression /descendant::p will be considered. This can be represented as [1;2](p→*) in a BTLP expression, where "*" is a symbol which indicates that a node is selected. φ→ψ is an abbreviation of ¬φ∨ψ, so that [1;2]](p→*) is equivalent to [1;2](¬φ∨*).

The purpose of using an existing algorithm is to take advantage of characteristics of a modal logic, which indicate "that [1;2]φ is established" is equal to "that φ is established and concurrently with [1;2]φ is established in each of a node on the left and a youngest child node". An equation that is described as the following expression is established.

[1;2](φ)=φ∧1[1;2](φ)∧2[1;2]φ

By using the characteristics, the existing algorithm operates as follows:

1. At first, a state corresponding to an expression [1;2](¬a∨*) is expanded by using the above equivalence relation and equality of (φ∨φ')∧ψ and (φ∧φ')∨ψ.

[1;2](¬a∨*)=(¬a∨1[1;2](¬a∨*)∧2[1;2](¬a∨*))∨

This generates two states 0, 1 of the expression below, which correspond to both sides of an obtained −.

¬a∨[1;2]((¬a∨1*)·∧2[1;2](¬a∨*),

*∧1[1;2](¬a∧*)∧2[1;2](¬a∨*),

2. Next, a state transition δ is generated for each state. Here, a state ¬a∧1[1;2](¬a∨*).∧[1;2](¬a∨*), can be considered to be a state reached from a state in one direction [1;2](¬a∨*) (in the direction of a left node) and a state in two directions [1;2](¬a∧*) (in the direction of lower nodes). In the same manner, *∧1[1;2](¬a∧*)∧2[1;2] (¬a∨*) can be converted to a state transition. FIG. 23 shows an automaton generated in this manner.

[1;2](¬a∨*) appearing in the table shown in FIG. 23 four times is an initial expression prior to expansion. That is to say, this is expanded again, ¬∨[1;2]((¬a∨1*).∧2[1;2](¬a∨*), *∧1[1;2](¬a∧*)∧2[1;2] (¬a∨*) are obtained. An automaton shown in FIG. 24 can be generated by assigning codes 0, 1 to respective states indicated in the expression.

3. Specify initial state I by {0,1}, final state F by {0,1}, and search state Θ by {1}. A final state in the present invention refers to states 0, 1 that are expanded from an initial expression [1;2](¬a∨1*). As each state is an initial state as far as it does not include a condition of mode (b), 0, 1 are also in initial state. A search state is indicated as following expression

*∧[1;2](¬a∧*)∧2[1;2](¬a∧*) i.e., it is 1. Therefore, a query automaton shown in FIG. 25 is generated.

In the present invention, a modification for treating earlier modes of −1, −2 is provided. More specifically, in the modification according to the present invention, variable "q" is defined as "state", which is considered to be a data structure (list structure) represented in BNF notation of the expression below.

Q::=<Ψ,q>|T|ε, where Ψ is a set consisting of modal logic expressions in the form of bφ or σ. Here, when q=<Ψ, q'>, Ψ is represented by "q.term", and q' is represented by "q.base" (particularly, when q1.term=q2.term, and q1.base=q2.base, q1=q2.). qsucc1, q.succ2, q.prec1, or q.prec2 is a value accompanying a state "q" (in an auxiliary manner), without being involved in a determination of q1=q2. q.sub can be defined as q.sub={q'|q'.base=q}, which is a set of states with "q" as a "base".

Finally, globally valid variable is "a set of states" Q, P, S, Resolved and "a set of tuples of three states" AD, AU, BD, BU, CU, and CD. A set of tuples of three states corresponds to a tuple of a left node state, a lower node state, and a reached state in an automaton. An algorithm of a compiling device described in the present invention is defined by three functions such as "main", "expand", and "extend".

Figure 26:
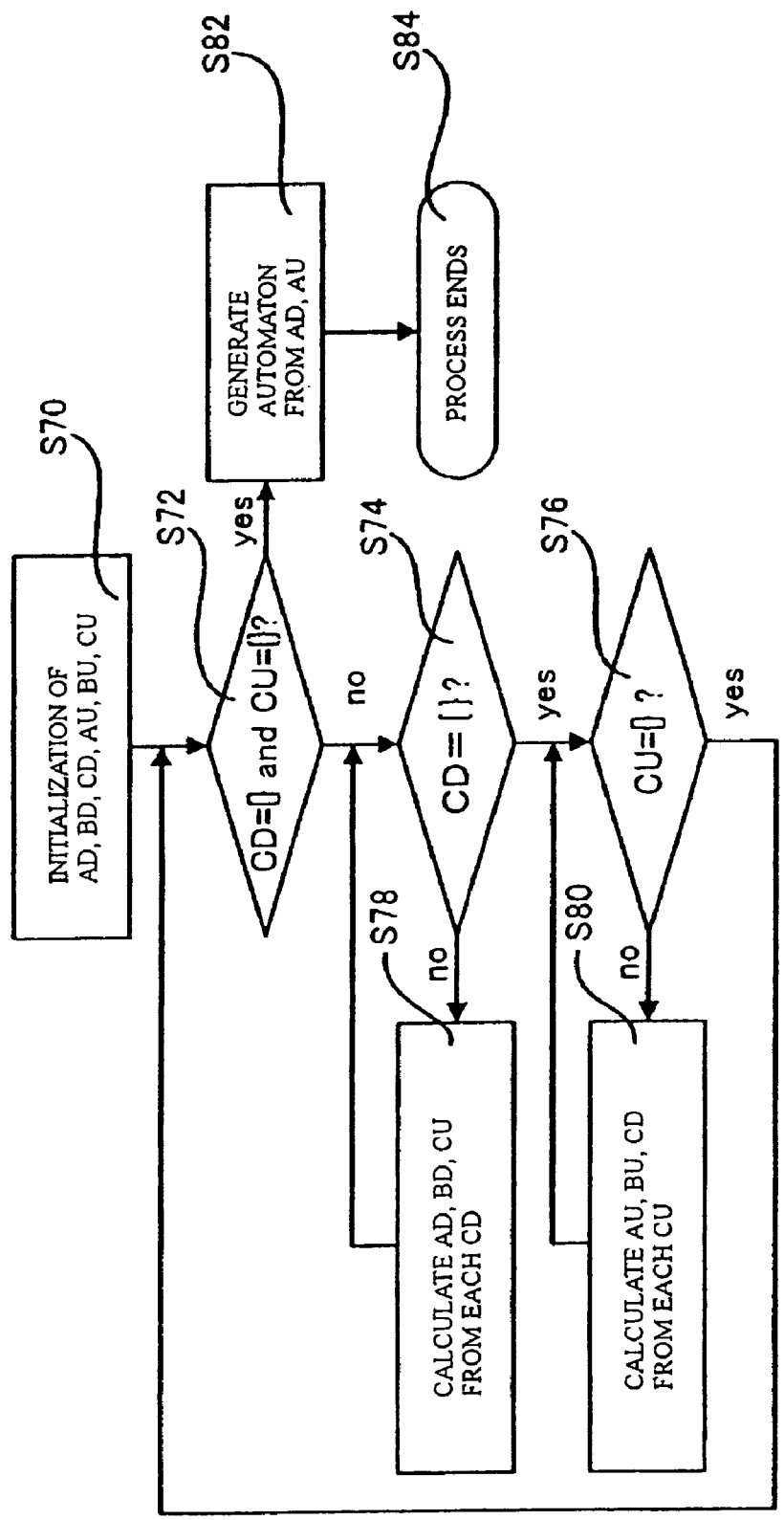
FIG. 26 is a flowchart of processes that are performed by a function "main" for generating a query automaton in the present invention.

FIG. 26 shows a flowchart of processes that are performed by a function "main" for generating a query automaton in the present invention. In processes of a function "main" for generating a query automaton in the present invention, at step S70, the function initializes a state set, and at step S72, the function determines whether CD (calculated by S-extend) and CU (calculated by P-extend), which are a set of tuples of three states needed to be calculated, are null or not. When it is null (yes), at step S82, the function generates a query automaton from AD and AU, and at step S82, the process ends. When it is not null (no) in a determination at step S72, function determines whether CD is null or not at step S74. When CD is not null (no), AD, BD, and CU are calculated from each CD at step S78 until CD becomes null. When CD is determined to be null (yes), the function determines whether CU=null or not at step S76. When CU is not null (no), the process proceeds to step S80, where AU, BU, and CD are calculated from each CU until it is determined to be CU=null (no tuple of three states needed to be calculated exists), and generation of a final query automaton is performed.

FIG. 27 shows a pseudo-code of a function "main" for performing a process of "translating an expression into a transition of an automaton when the expression is in a form, which can be considered as a transition of an automaton, as a result of rewriting". A function "main" calls functions S-extend and P-extend and constructs a query automaton, with constructing a new state. A return value of a function "main" provides a pair of a set of states of an automaton, and a set of a final state and transition. A search state of a query automaton is defined as Θ={q|*εq.term}. The first function "expand" performs a process of "rewriting an expression". FIG. 28 shows a pseudo-code of a function "expand".

In the pseudo-code shown in FIG. 28, b'm is defined as 1'1;2. U_{b⊏m} . . . is considered to be the sum of sets described in the following expression as expand(ΦUΨU{1<1;2>Ψ, (2)})U expand(ΦUΨU{2<1;2>Ψ, (2)})

when m=1;2, for example.

In the pseudo-code shown in FIG. 28, s is defined as follows:

σ::=a
|*
|(b)
|σΛσ
|σVσ
|¬σ

That is to say, σ is a BTLP expression that includes no mode. An algorithm of the embodiment performs a process of retrieving a condition for transition from the above-mentioned σ.

A means of evaluating a function is the same as that of interpreting terms and pseudo-codes. A function "expand" receives a set of expressions and keeps transforming of it until it becomes either form of bφ, σ through an equivalent rewriting. To describe processes along a pseudo-code shown in FIG. 28, the function performs operations of reading out expressions one after another by "for" sentence shown in the third line, and rewriting the expressions on the basis of their form by pattern matching by "case" sentence shown from the fifth to the twelfth lines. An expression in the form of s is not rewritten further at the sixth line and returned at the fifteenth line. An expression in the form of bφ is not rewritten further by "otherwise" at the eleventh line and returned at the sixteenth line.

FIG. 29 shows a pseudo-code of functions S-extend and P-extend. A pseudo-code shown in FIG. 29, (hereinafter both are defined as "d-extend" collectively ("d" is a variable)) d-extend performs the part, "considering an XPath expression or an expression that is a slightly expanded XPath expression as a state of automaton" and the part, "when it is in a form, which can be considered as a transition of an automaton as a result of rewriting, translating it into a transition of an automaton".

A means of evaluating a function is the same as that of interpreting terms and pseudo-codes. To brief what a function performs, a function "extend" receives a set of expressions and generates a set of states therefrom. At the same time, it generates a state transition of a query automaton. To describe specific processes, arguments (q, Φ) on the first line are basic states, respectively, making a set of expressions to be converted to a state. A function "expand" is called at the fourth line, and Φ is transformed until it becomes any form of bφ, σ through equivalent rewriting. "for" at the sixth line enumerates respective results of a function "expand" and a state "q'" is constructed from the seventh to the tenth lines. If a state "q'" is not in any of the states that have been generated, processes from the thirteenth to the thirty-seventh lines are performed. From the fourteenth to the seventeenth lines, data necessary for the following calculation is generated. From the eighteenth to the twenty-fourth lines are a part for adding a state transition, which should be added in the case that a new state "q'" is created by S-expand. From the twenty-seventh to the thirty-sixth lines shown in FIG. 29 are a part for adding a state transition, which should be added in the case that a new state "q'" is created by P-expand.

Each means described in the present invention can be configured with a software module, which is arranged as software, in a computer or information processing device that includes central processing unit (CPU), memory such as RAM or ROM, and storage means such as a hard disk. A software module described above can be configured as a different functional block configuration, instead of being included in a configuration corresponding to a functional block shown in drawings, as far as it has a functionality described above in the present invention. A program for causing a computer to execute a method according to the present invention can be written in various programming languages, such as assembler language, C language, C++ language, Java©. A code describing a program according to the present invention may be included as firmware in RAM, ROM, or flush memory, or held on a computer-readable storage medium such as a magnetic tape, a flexible disc, a hard disk, a compact disk, a magneto-optical disk, a digital versatile disk (DVD).

While the invention has been described with respect to certain preferred embodiments and exemplifications, it is not intended to limit the scope of the invention thereby, but solely by the claims appended hereto.

The invention claimed is:

1. A computer-implemented document-searching method for searching a document having a hierarchical structure with elements separated by element identifiers, comprising the steps of:
generating an XPATH query automaton,
wherein XPATH is an XML (Extensible Markup Language) path for searching an XML document;
wherein the XPATH query automaton is a table that contains a plurality of states of backward nodes, a condition for transition, and a search state;
wherein a collection of entries of the XPATH query automaton expresses a state transition;
wherein the generating the XPATH query automaton comprises steps of:
generating and registering the state transition, wherein the generating and registering the state transition comprises:
replacing an XPATH axis including an XPATH axis in a forward direction that is exemplified as an axis child, or a descendant in an XPATH into the state transition,
replacing an XPATH axis including an XPATH axis in an opposite direction that is exemplified as axis parent, ancestor in an XPATH into the state transition,
replacing an XPATH axis including an XPATH axis in a direction of a following-sibling, or a preceding-sibling in said XPATH into the state transition,
replacement of a predicate of an XPATH into the state transition,
replacement of a logical product AND of a predicate of an XPATH into the state transition,
replacement of a logical add OR of a predicate of an XPATH into the state transition,
replacement of a logical NOT of a predicate of an XPATH into the state transition, and
wherein replacing and replacement keep an input XPATH query expression equal in terms of a search, and generates the XPATH query automaton including the plurality of states of the backward nodes, the condition for transition, and the search state, wherein the search state includes two states of said input XPATH query expression concurrently in the state transition, and wherein every axis regarding sibling relationship among nodes of the document is included in a condition for the XPATH query automaton;

a query automaton evaluator determining the state transition of a node under determination by storing a left node and a lower node in correspondence with an identified element identifier, wherein information obtained from said left node and information obtained from said lower node for the state transition is used concurrently, and evaluating said XPATH query automaton with a search result of said left node and said lower node;
storing the XPATH query automaton generated by a compiling device in a query automaton storage device;
reading out the XPATH query automaton from said query automaton storage device and storing the XPATH query automaton while reading in said document and performing a stream search with the XPATH query automaton evaluator by using states of a plurality of different types of nodes in said element identifiers included in said document and said XPATH query automaton, thereby using two inputs and a search state; and
storing an output of the query automaton evaluator in a result-storage device and thereafter outputting the stored output of the query automaton evaluator and the output of a searched node.

2. The document-searching method according to claim 1, wherein the step of generating an XPATH query automaton comprises a step of generating an XPATH query automaton with the state transition corresponding to an initial state, a final state, and a search state registered thereon.

3. A computer-implemented compiling method for performing a document search, comprising steps of:
generating a XPATH query automaton;
wherein XPATH is an XML (Extensible Markup Language) path for searching an XML document;
wherein the XPATH query automaton is a table that contains a plurality of states of backward nodes, a condition for transition, and a search state;
wherein a collection of entries of the XPATH query automaton expresses a state transition;
wherein the generating the XPATH query automaton comprises steps of:
generating and registering the state transition, wherein the generating and registering the state transition comprises:
replacing an XPATH axis including an XPATH axis in a forward direction that is exemplified as an axis child, or descendant in an XPATH into the state transition,
replacing an XPATH axis including an XPATH axis in an opposite direction that is exemplified as an axis parent, or ancestor in an XPATH into the state transition,
replacing an XPATH axis including an XPATH axis in a direction of a following-sibling or a preceding-sibling sibling in an XPATH into a state transition,
replacement of a predicate of an XPATH into the state transition,
replacement of a logical product AND of a predicate of an XPATH into the state transition,
replacement of a logical add OR of a predicate of an XPATH into a state transition, replacement of a logical NOT of a predicate of an XPATH into the state transition, and
wherein replacing and replacement keep an input XPATH query expression equal in terms of search, and storing a plurality of states of the backward nodes in correspondence with the backward nodes into a query automaton storage device;

wherein the generated XPATH query automaton comprises registering a plurality of states of said backward nodes, a condition for transition, the search state, wherein said search state includes two states of said input XPATH query expression concurrently in the state transition, wherein every axis regarding sibling relationship among nodes of the document is included in a condition for the XPATH query automaton, and a reached state in correspondence with each other in the storage device, performing parsing of the input XPATH query expression, and identifying different types of nodes in element identifiers;

wherein the generating and registering the state transition farther includes the query automaton including the plurality of states of the backward nodes, the condition for transition, and at least a search state, a query automaton evaluator determining the state transition of a node in the document under determination by storing a left node and a lower node in correspondence with an identified element identifier, wherein information obtained from said left node and information obtained from said lower node for the state transition are used concurrently, and evaluating said XPATH query automaton with a search result of said left node and said lower node; and storing the output of the query automaton evaluator in a result-storage device and thereafter outputting the stored output of the query automaton evaluator and the output of a searched node.

4. The compiling method according to claim 3, wherein said compiling method comprises a step of identifying said backward node as a left node or a lower node according to a type of said element identifier, and wherein said plurality of states are states of said left node and said lower node.

* * * * *